United States Patent
Gao et al.

(10) Patent No.: US 10,257,285 B2
(45) Date of Patent: Apr. 9, 2019

(54) RESOURCE MIGRATION METHOD AND APPARATUS

(71) Applicant: HUAWEI DEVICE CO., LTD., Dongguan, Guangdong (CN)

(72) Inventors: Linyi Gao, Beijing (CN); Guodong Xue, Shenzhen (CN); Qi Yu, Beijing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 177 days.

(21) Appl. No.: 14/900,785

(22) PCT Filed: Jul. 8, 2014

(86) PCT No.: PCT/CN2014/081782
§ 371 (c)(1),
(2) Date: Dec. 22, 2015

(87) PCT Pub. No.: WO2015/003603
PCT Pub. Date: Jan. 15, 2015

(65) Prior Publication Data
US 2016/0156722 A1 Jun. 2, 2016

(30) Foreign Application Priority Data

Jul. 11, 2013 (CN) .......................... 2013 1 0291245

(51) Int. Cl.
*G06F 15/173* (2006.01)
*H04L 29/08* (2006.01)
*H04W 4/70* (2018.01)

(52) U.S. Cl.
CPC ............ *H04L 67/148* (2013.01); *H04L 67/16* (2013.01); *H04L 69/329* (2013.01); *H04W 4/70* (2018.02)

(58) Field of Classification Search
CPC ....... H04L 29/08; H04L 67/148; H04L 67/16; H04L 69/329
(Continued)

(56) References Cited

U.S. PATENT DOCUMENTS 5,978,842 A * 11/1999 Noble ................. G06F 17/3089
707/999.01
6,415,315 B1 * 7/2002 Glass ...................... G06F 9/465
709/201
(Continued)

FOREIGN PATENT DOCUMENTS

CN   102056266 A   5/2011
CN   102340760 A   2/2012
(Continued)

OTHER PUBLICATIONS

Extended European Search Report dated May 10, 2016 in corresponding European Patent Application No. 14822119.5.
(Continued)

*Primary Examiner* — Anthony Mejia
(74) *Attorney, Agent, or Firm* — Staas & Halsey LLP

(57) ABSTRACT

A resource migration method and apparatus are provided, so that a terminal device can change, according to a specific condition, an SFE serving the terminal device. The method includes: determining, by a terminal device, that a service function entity SFE serving the terminal device needs to be changed to a first SFE; acquiring information about a location of a resource/subresource corresponding to the terminal device in a second SFE, where the second SFE saves the resource/subresource corresponding to the terminal device; and sending, to the first SFE, a first identifier and the information about the location in the second SFE, where the first identifier is used to indicate that the terminal device needs to change the SFE serving the terminal device, so that the first SFE transfers, after receiving the first identifier, the
(Continued)

---

S101. A terminal device determines that an SFE serving the terminal device needs to be changed to a first SFE S102. The terminal device acquires information about a location of a resource/subresource corresponding to the terminal device in a second SFE S103. The terminal device sends, to the first SFE, a first identifier and the information about a location of the resource/subresource corresponding to the terminal device in the second SFE resource/subresource corresponding to the terminal device from the second SFE to the first SFE.

20 Claims, 11 Drawing Sheets

(58) Field of Classification Search
   USPC ........................................................ 709/223
   See application file for complete search history.

(56) References Cited

U.S. PATENT DOCUMENTS

| | | | | |
|---|---|---|---|---|
| 7,415,470 | B2* | 8/2008 | Kasamsetty | G06F 9/5088 |
| 9,197,489 | B1* | 11/2015 | Vincent | H04L 67/148 |
| 9,928,107 | B1* | 3/2018 | Vincent | G06F 9/4856 |
| 2002/0198953 | A1* | 12/2002 | O'Rourke | H04L 29/06 |
| | | | | 709/213 |
| 2003/0088587 | A1* | 5/2003 | Merrells | H04L 29/06 |
| 2004/0143643 | A1* | 7/2004 | Takamoto | G06F 17/30067 |
| | | | | 709/215 |
| 2005/0154768 | A1* | 7/2005 | Theimer | H04L 29/12066 |
| 2006/0143350 | A1* | 6/2006 | Miloushev | G06F 9/5016 |
| | | | | 710/242 |
| 2008/0155647 | A1* | 6/2008 | Miyawaki | H04L 63/0227 |
| | | | | 726/1 |
| 2008/0215755 | A1* | 9/2008 | Farber | G06F 9/505 |
| | | | | 709/245 |
| 2011/0032896 | A1* | 2/2011 | Cubic | H04L 41/00 |
| | | | | 370/329 |
| 2012/0254372 | A1* | 10/2012 | Vandendorpe | H04L 67/42 |
| | | | | 709/220 |
| 2016/0021182 | A1* | 1/2016 | Bansal | H04L 67/1095 |
| | | | | 709/219 |
| 2016/0036653 | A1* | 2/2016 | Deguchi | G06F 3/0635 |
| | | | | 709/219 |

FOREIGN PATENT DOCUMENTS

| | | |
|---|---|---|
| EP | 2 547 040 A1 | 1/2013 |
| EP | 2 945 326 A1 | 11/2015 |
| WO | 2011/112683 A1 | 9/2011 |
| WO | 2012/068465 A1 | 5/2012 |
| WO | 2013/073747 A1 | 5/2013 |
| WO | 2014/127255 A1 | 8/2014 |
| WO | 2014/182674 A1 | 11/2014 |

OTHER PUBLICATIONS

International Search Report dated Oct. 13, 2014 in corresponding International Patent Application No. PCT/CN2014/081782.
International Search Report dated Oct. 13, 2014, in corresponding International Application No. PCT/CN2014/081782.

* cited by examiner

RESOURCE MIGRATION METHOD AND APPARATUS

CROSS REFERENCE TO RELATED APPLICATIONS

This application is a U.S. National Stage Application, which claims the benefit under 35 U.S.C. 371 of PCT International Patent Application No. PCT/CN2014/081782, filed Jul. 8, 2014, which is based on and claims the foreign priority benefit under 35 U.S.C. 119 of Chinese Patent Application No. 201310291245.X, filed Jul. 11, 2013, the contents of which are incorporated herein by reference in their entirety.

TECHNICAL FIELD

The present invention relates to the field of communications, and in particular, to a resource migration method and apparatus.

BACKGROUND

Machine to machine (M2M, Machine to Machine) communication is a collective term for a series of technologies and technical combinations that are used for implementing data communication and interaction between machines and between a human being and a machine by using various communication networks (such as a communication network, the Internet, and an industry network) and by means of information perception and processing.

The M2M communication expands a communication range of an existing information communication network, and implements information transmission, coordination, and processing by deploying a terminal device having perception and processing capabilities and by using network facilities, so that various applications such as logistics management, electricity meter reading, and health surveillance can conveniently acquire various kinds of required information, thereby improving working efficiency, reducing labor costs, and bringing multiple flexible and creative service modes.

An M2M architecture may be divided into a network domain, a terminal device, and a gateway domain. The network domain includes an M2M application layer, an M2M service capability layer, a core network layer, and an access network layer from top to bottom; the terminal device and the gateway domain include a terminal device and a gateway, where the gateway includes an application layer and a service capability layer, and the terminal device includes a D terminal device including an application layer and a service capability layer and a D' terminal device including only an application layer. The D terminal device can directly connect to a network, while the D' terminal device needs to use the gateway to connect to the network.

The prior art has not yet supported migration of a terminal device between different service function entities (SFE, Service Function Entity).

SUMMARY

Embodiments of the present invention provide a resource migration method and apparatus, which can change an SFE serving a terminal device.

To achieve the foregoing objective, the embodiments of the present invention use the following technical solutions:

According to a first aspect, a resource migration method is provided, where the method includes:

determining, by a terminal device, that a service function entity SFE serving the terminal device needs to be changed to a first SFE;

acquiring information about a location of a resource/subresource corresponding to the terminal device in a second SFE, where the second SFE saves the resource/subresource corresponding to the terminal device; and sending, to the first SFE, a first identifier and the information about the location of the resource/subresource corresponding to the terminal device in the second SFE, where the first identifier is used to indicate that the terminal device needs to change the SFE serving the terminal device, so that the first SFE transfers, after receiving the first identifier, the resource/subresource corresponding to the terminal device from the second SFE to the first SFE.

According to the first aspect, in a first possible implementation manner, before the sending, to the first SFE, a first identifier and the information about the location of the resource/subresource corresponding to the terminal device in the second SFE, the method further includes:

sending, by the terminal device, a first resource creation request to the first SFE, where the first resource creation request is used to request the first SFE to create a resource according to the first resource creation request, the first resource creation request registers the terminal device with the first SFE, and the first resource creation request does not carry the first identifier and the information about the location of the resource/subresource corresponding to the terminal device in the second SFE; and receiving, by the terminal device, a response to the first resource creation request, where the response is sent by the first SFE.

According to the first possible implementation manner, in a second possible implementation manner, the sending, to the first SFE, a first identifier and the information about the location of the resource/subresource corresponding to the terminal device in the second SFE includes:

in a case in which the response to the first resource creation request indicates that resource creation succeeds, sending, to the first SFE, the first identifier and the information about the location of the resource/subresource corresponding to the terminal device in the second SFE.

According to the first aspect, in a third possible implementation manner, the sending, to the first SFE, a first identifier and the information about the location of the resource/subresource corresponding to the terminal device in the second SFE includes:

sending, by the terminal device, a first resource creation request to the first SFE, where the first resource creation request carries the first identifier and the information about the location of the resource/subresource corresponding to the terminal device in the second SFE.

According to the first aspect or any one of the foregoing four possible implementation manners, in a fourth possible implementation manner, if the first SFE does not have rights to retrieve the resource/subresource from the second SFE, the method further includes:

sending an access rights update request to the second SFE, where the access rights update request is used to request the second SFE to grant the first SFE the rights to retrieve the resource/subresource from the second SFE; and receiving, from the second SFE, a response to the retrieve rights update request.

According to the fourth possible implementation manner, in a fifth possible implementation manner, the method further includes: sending an access rights retrieve request to the second SFE, where the access rights retrieve request is used to determine whether the first SFE has the rights to retrieve the resource/subresource from the second SFE; and receiving, from the second SFE, a response to the access rights retrieve request.

According to the fifth possible implementation manner, in a sixth possible implementation manner, the sending an access rights update request to the second SFE includes:

in a case in which the response to the access rights retrieve request indicates that the first SFE does not have the rights to access the resource/subresource in the second SFE, sending the access rights update request to the second SFE.

According to the first aspect, in a seventh possible implementation manner, the method further includes:

receiving resource transfer success indication information sent by the first SFE, where the resource transfer success indication information is used to indicate that the resource/subresource corresponding to the terminal device has been transferred from the second SFE to the first SFE.

According to the seventh possible implementation manner, in an eighth possible implementation manner, the resource transfer success indication information is a response indicating a success of a second resource creation request or a response indicating a success of a resource update request, where the second resource creation request is used to request the first SFE to create a subresource.

According to the seventh or eighth possible implementation manner, in a ninth possible implementation manner, the method further includes:

sending a resource deletion request or a resource update request to a third SFE, where the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

According to the first aspect or any one of the foregoing nine possible implementation manners, in a tenth possible implementation manner, the second SFE is a serving SFE that serves the terminal device before the terminal device changes the SFE serving the terminal device or a transit SFE with which the first SFE and the third SFE are both registered, where the third SFE is a serving SFE that serves the terminal device before the terminal device changes the SFE serving the terminal device.

According to the first aspect, in an eleventh possible implementation manner, if the second SFE and a third SFE are different SFEs, and the third SFE is a serving SFE that serves the terminal device before the terminal device changes the SFE serving the terminal device, and after the determining, by a terminal device, that an SFE serving the terminal device needs to be changed to a first SFE, the method further includes:

sending, by the terminal device, the first identifier to the third SFE, so that the third SFE sends the resource/subresource corresponding to the terminal device to the second SFE; and receiving the information about the location of the resource corresponding to the terminal device in the second SFE, where the information about the location is sent by the second SFE.

According to the first aspect or any one of the foregoing eleven possible implementation manners, in a twelfth possible implementation manner, the information about the location includes a save path or a uniform resource identifier URI of the resource/subresource corresponding to the terminal device in the second SFE.

According to a second aspect, a resource migration method is provided, where the method includes:

receiving, by a first SFE, a first identifier and information about a location of a resource/subresource corresponding to the terminal device in a second SFE, where the first identifier is used to indicate that the terminal device needs to change an SFE serving the terminal device;

sending a resource retrieve request to the second SFE, where the resource retrieve request includes the information about the location of the resource/subresource corresponding to the terminal device in the second SFE; and receiving and storing content, which is returned by the second SFE, of the resource/subresource.

According to the second aspect, in a first possible implementation manner, the receiving, by a first SFE, a first identifier and information about a location of a resource/subresource corresponding to the terminal device in a second SFE includes:

receiving, by the first SFE, the first identifier and the information about the location of the resource/subresource corresponding to the terminal device in the second SFE that are sent by the terminal device; or receiving, by the first SFE, the first identifier and the information about the location of the resource/subresource corresponding to the terminal device in the second SFE that are sent by a serving SFE that serves the terminal device before the terminal device changes the SFE serving the terminal device.

According to the second aspect, in a second possible implementation manner, before the receiving, by a first SFE, a first identifier and information about a location of a resource/subresource corresponding to the terminal device in a second SFE, the method further includes:

receiving a first resource creation request, and creating a corresponding resource according to the first resource creation request; and sending a response to the first resource creation request to the terminal device.

According to the second possible implementation manner, in a third possible implementation manner, the receiving, by a first SFE, a first identifier and information about a location of a resource/subresource corresponding to the terminal device in a second SFE includes:

in a case in which the response to the first resource creation request indicates that resource creation succeeds, receiving a resource transfer request, where the resource transfer request carries the first identifier and the information about the location of the resource/subresource corresponding to the terminal device in the second SFE.

According to the third possible implementation manner, in a fourth possible implementation manner, the resource transfer request is a second resource creation request or a resource update request, where the second resource creation request is used to request the first SFE to create a subresource.

According to the second aspect, in a fifth possible implementation manner, the receiving, by a first SFE, a first identifier and information about a location of a resource/subresource corresponding to the terminal device in a second SFE includes:

receiving a first resource creation request, where the first resource creation request carries the first identifier and the information about the location of the resource/subresource corresponding to the terminal device in the second SFE; and creating a corresponding resource according to the first resource creation request.

According to the second aspect, in a sixth possible implementation manner, if the first SFE receives the information about the location of the subresource of the terminal device in the second SFE, the receiving and storing content, which is fed back by the second SFE according to the information about the location, of the subresource includes:

creating a subresource according to the information about the location of the subresource of the terminal device in the second SFE; and receiving the content, which is fed back by the second SFE according to the information about the location, of the subresource, and saving the received content into the created subresource.

According to the second aspect, in a seventh possible implementation manner, the receiving and storing content, which is fed back by the second SFE according to the information about the location, of the resource/subresource includes:

receiving the content, which is returned by the second SFE according to the information about the location, of the resource/subresource;

creating a corresponding subresource according to the content of the resource/subresource; and saving the received content, which is fed back by the second SFE according to the information about the location, of the resource/subresource into the created resource/subresource.

According to the second or the fifth possible implementation manner, in an eighth possible implementation manner, after the creating a corresponding resource according to the first resource creation request, the method further includes:

declaring, by the first SFE, the created resource to an SFE to which the created resource needs to be declared; and after the receiving and storing content, which is fed back by the second SFE according to the information about the location, of the resource/subresource, the method further includes:

declaring, by the first SFE, the received and stored resource to an SFE to which the received and stored resource needs to be declared.

According to the second aspect, in a ninth possible implementation manner, the method further includes:

sending resource transfer success indication information to the terminal device, where the indication information is used to indicate that the resource/subresource corresponding to the terminal device has been transferred from the second SFE to the first SFE; and the method further includes:

sending resource transfer success indication information to the terminal device, where the indication information is used to indicate that the resource/subresource corresponding to the terminal device has been transferred from the second SFE to the first SFE.

According to the ninth possible implementation manner, in a tenth possible implementation manner, the resource transfer success indication information is a response indicating a success of a second resource creation request or a response indicating a success of a resource update request, where the second resource creation request is used to request the first SFE to create a subresource.

According to the second aspect, in an eleventh possible implementation manner, the sending a resource retrieve request to the second SFE includes:

sending, by the first SFE, the resource retrieve request to a fourth SFE, so that the fourth SFE sends the resource retrieve request to the second SFE, where the fourth SFE is a transit SFE with which the first SFE and the second SFE are both registered, and the second SFE is a serving SFE that serves the terminal device before the terminal device changes the SFE serving the terminal device.

According to the eleventh possible implementation manner, in a twelfth possible implementation manner, the receiving and storing content, which is fed back by the second SFE according to the information about the location, of the resource/subresource includes:

receiving the content, which is fed back by the second SFE according to the information about the location, of the resource/subresource, where the content is received by the fourth SFE from the second SFE.

According to the second aspect or any one of the foregoing twelve possible implementation manners, in a thirteenth possible implementation manner, the information about the location includes a save path or a uniform resource identifier URI of the resource/subresource corresponding to the terminal device in the second SFE.

According to a third aspect, a resource migration method is provided, where the method includes:

receiving a resource retrieve request sent by a first SFE, where the resource retrieve request includes information about a location of a resource/subresource corresponding to the terminal device in a second SFE; and sending a response to the resource retrieve request to the first SFE, where the response includes content, which is returned by the second SFE according to the information about the location, of the resource/subresource.

According to the third aspect, in a first possible implementation manner, if the first SFE does not have rights to retrieve the resource/subresource from the second SFE, the method further includes:

receiving an access rights update request sent by the terminal device, where the access rights update request is used to request the second SFE to grant the first SFE the rights to retrieve the resource/subresource from the second SFE; and sending a response to the access rights update request to the terminal device.

According to the first possible implementation manner, in a second possible implementation manner, the method further includes:

receiving an access rights retrieve request sent by the terminal device, where the access rights retrieve request is used to determine whether the first SFE has the rights to retrieve the resource/subresource from the second SFE; and granting the first SFE the rights to retrieve the resource/subresource from the second SFE.

According to the third aspect or either of the foregoing two possible implementation manners, in a third possible implementation manner, the sending a response to the resource retrieve request to the first SFE includes:

if the first SFE has the rights to retrieve the resource/subresource from the second SFE, sending the response to the resource retrieve request to the first SFE.

According to the third aspect, in a fourth possible implementation manner, the method further includes:

if the second SFE and a third SFE are a same SFE, and the second SFE is an SFE that serves the terminal device before the terminal device changes the SFE serving the terminal device, receiving, by the second SFE, a resource deletion request sent by the terminal device, where the request is used to instruct the second SFE to delete the resource corresponding to the terminal device from the second SFE.

According to the third aspect, in a fifth possible implementation manner, the method further includes:

if the second SFE and a third SFE are a same SFE, and the second SFE is an SFE that serves the terminal device before the terminal device changes the SFE serving the terminal device, receiving, by the second SFE, an expiration time update request sent by the terminal device, where the expiration time update request is used to update an expiration time of the resource.

According to the third aspect, in a sixth possible implementation manner, if the second SFE and a third SFE are different SFEs, and the third SFE is an SFE that serves the terminal device before the terminal device changes the SFE serving the terminal device, and if the resource/subresource corresponding to the terminal device has been declared in the second SFE, before the receiving a resource retrieve request sent by a first SFE, the method further includes:

receiving content, which is sent by the third SFE, of the resource/subresource corresponding to the terminal device;

creating a corresponding resource/subresource according to the content, which is sent by the third SFE, of the resource/subresource corresponding to the terminal device;

saving the content, which is sent by the third SFE, of the resource/subresource corresponding to the terminal device into the created resource/subresource; and sending information about a location of the resource/subresource created by the second SFE to the terminal device.

According to the sixth possible implementation manner, in a seventh possible implementation manner, if the resource/subresource corresponding to the terminal device has not been declared in the second SFE, the method further includes:

declaring, by the third SFE, the resource/subresource corresponding to the terminal device to the second SFE, so that the second SFE creates a declaration resource corresponding to the terminal device.

According to the third aspect or any one of the foregoing seven possible implementation manners, in an eighth possible implementation manner, the information about the location includes a save path or a uniform resource identifier URI of the resource/subresource corresponding to the terminal device in the second SFE.

According to the third aspect or any one of the foregoing eight possible implementation manners, in a ninth possible implementation manner, if the second SFE is an SFE that serves the terminal device before the terminal device changes the SFE serving the terminal device, the method further includes:

sending, to the first SFE, a first identifier and the information about the location of the resource/subresource corresponding to the terminal device in the second SFE, where the first identifier is used to indicate that the terminal device needs to change the SFE serving the terminal device.

According to a fourth aspect, a resource migration apparatus is provided, where the apparatus includes:

a determining unit, configured to determine, by a terminal device, that a service function entity SFE serving the terminal device needs to be changed to a first SFE;

an acquiring unit, configured to acquire information about a location of a resource/subresource corresponding to the terminal device in a second SFE, where the second SFE saves the resource/subresource corresponding to the terminal device; and a sending unit, configured to send, to the first SFE, a first identifier and the information about the location of the resource/subresource corresponding to the terminal device in the second SFE, where the first identifier is used to indicate that the terminal device needs to change the SFE serving the terminal device, so that the first SFE transfers, after receiving the first identifier, the resource/subresource corresponding to the terminal device from the second SFE to the first SFE.

According to the fourth aspect, in a first possible implementation manner, the apparatus further includes a receiving unit, where:

the sending unit is further configured to send, by the terminal device, a first resource creation request to the first SFE, where the first resource creation request is used to request the first SFE to create a resource according to the first resource creation request, the first resource creation request registers the terminal device with the first SFE, and the first resource creation request does not carry the first identifier and the information about the location of the resource/subresource corresponding to the terminal device in the second SFE; and the receiving unit is configured to receive, by the terminal device, a response to the first resource creation request, where the response is sent by the first SFE.

According to the first possible implementation manner, in a second possible implementation manner, the sending unit is specifically configured to:

in a case in which the response to the first resource creation request indicates that resource creation succeeds, send, to the first SFE, the first identifier and the information about the location of the resource/subresource corresponding to the terminal device in the second SFE.

According to the fourth aspect, in a third possible implementation manner, the sending unit is specifically configured to:

send, by the terminal device, a first resource creation request to the first SFE, where the first resource creation request carries the first identifier and the information about the location of the resource/subresource corresponding to the terminal device in the second SFE.

According to the fourth aspect or the foregoing three possible implementation manners, in a fourth possible implementation manner, the sending unit is further configured to: if the first SFE does not have rights to retrieve the resource/subresource from the second SFE, send an access rights update request to the second SFE, where the access rights update request is used to request the second SFE to grant the first SFE the rights to retrieve the resource/subresource from the second SFE; and the receiving unit is further configured to receive, from the second SFE, a response to the retrieve rights update request.

According to the fourth possible implementation manner, in a fifth possible implementation manner, the sending unit is further configured to send an access rights retrieve request to the second SFE, where the access rights retrieve request is used to determine whether the first SFE has the rights to retrieve the resource/subresource from the second SFE; and the receiving unit is further configured to receive, from the second SFE, a response to the access rights retrieve request.

According to the fifth possible implementation manner, in a sixth possible implementation manner, the sending unit is specifically configured to:

in a case in which the response to the access rights retrieve request indicates that the first SFE does not have the rights to retrieve the resource/subresource from the second SFE, send the access rights update request to the second SFE.

According to the fourth aspect, in a seventh possible implementation manner, the receiving unit is further configured to:

receive resource transfer success indication information sent by the first SFE, where the resource transfer success indication information is used to indicate that the resource/subresource corresponding to the terminal device has been transferred from the second SFE to the first SFE.

According to the seventh possible implementation manner, in an eighth possible implementation manner, the resource transfer success indication information is a response indicating a success of a second resource creation request or a response indicating a success of a resource update request, where the second resource creation request is used to request the first SFE to create a subresource.

According to the seventh or eighth possible implementation manner, in a ninth possible implementation manner, the sending unit is further configured to:

send a resource deletion request or a resource update request to a third SFE, where the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

According to the fourth aspect or any one of the foregoing nine possible implementation manners, in a tenth possible implementation manner, the second SFE is a serving SFE that serves the terminal device before the terminal device changes the SFE serving the terminal device or a transit SFE with which the first SFE and the third SFE are both registered, and the third SFE is a serving SFE that serves the terminal device before the terminal device changes the SFE serving the terminal device.

According to the fourth aspect, in an eleventh possible implementation manner, the sending unit is further configured to: in a case in which the second SFE and a third SFE are different SFEs, and the third SFE is a serving SFE that serves the terminal device before the terminal device changes the SFE serving the terminal device, and after the terminal device determines that the SFE serving the terminal device needs to be changed to the first SFE, send the first identifier to the third SFE, so that the third SFE sends the resource/subresource corresponding to the terminal device to the second SFE; and the receiving unit is further configured to receive the information about the location of the resource corresponding to the terminal device in the second SFE, where the information about the location is sent by the second SFE.

According to the fourth aspect or any one of the foregoing eleven possible implementation manners, in a twelfth possible implementation manner, the information about the location includes a save path or a uniform resource identifier URI of the resource/subresource corresponding to the terminal device in the second SFE.

According to a fifth aspect, a resource migration apparatus is provided, where the apparatus includes: a receiving unit, a sending unit, and a storage unit, where the receiving unit is configured to receive, by a first SFE, a first identifier and information about a location of a resource/subresource corresponding to a terminal device in a second SFE, where the first identifier is used to indicate that the terminal device needs to change an SFE serving the terminal device;

the sending unit is configured to send a resource retrieve request to the second SFE, where the resource retrieve request includes the information about the location of the resource/subresource corresponding to the terminal device in the second SFE;

the receiving unit is further configured to receive content, which is returned by the second SFE, of the resource/subresource; and the storage unit is configured to store the content, which is returned by the second SFE, of the resource/subresource.

According to the fifth aspect, in a first possible implementation manner, the receiving unit is specifically configured to:

receive, by the first SFE, the first identifier and the information about the location of the resource/subresource corresponding to the terminal device in the second SFE that are sent by the terminal device; or receive, by the first SFE, the first identifier and the information about the location of the resource/subresource corresponding to the terminal device in the second SFE that are sent by a serving SFE that serves the terminal device before the terminal device changes the SFE serving the terminal device.

According to the fifth aspect, in a second possible implementation manner, the apparatus further includes a resource creation unit, where the receiving unit is further configured to receive a first resource creation request before the first SFE receives the first identifier and the information about the location of the resource/subresource corresponding to the terminal device in the second SFE;

the resource creation unit is configured to create a corresponding resource according to the first resource creation request; and the sending unit is further configured to send a response to the first resource creation request to the terminal device.

According to the second possible implementation manner, in a third possible implementation manner, the receiving unit is specifically configured to:

in a case in which the response to the first resource creation request indicates that resource creation succeeds, receive a resource transfer request, where the resource transfer request carries the first identifier and the information about the location of the resource/subresource corresponding to the terminal device in the second SFE.

According to the third possible implementation manner, in a fourth possible implementation manner, the resource transfer request is a second resource creation request or a resource update request, and the second resource creation request is used to request the first SFE to create a subresource.

According to the fifth aspect, in a fifth possible implementation manner, the apparatus further includes a resource creation unit, where the receiving unit is specifically configured to receive a first resource creation request, where the first resource creation request carries the first identifier and the information about the location of the resource/subresource corresponding to the terminal device in the second SFE; and the resource creation unit is configured to create a corresponding resource according to the first resource creation request.

According to the fifth aspect, in a sixth possible implementation manner, the storage unit includes a subresource creation module and a saving module, where the subresource creation module is configured to: in a case in which the first SFE receives the information about the location of the subresource of the terminal device in the second SFE, create a subresource according to the information about the location of the subresource of the terminal device in the second SFE;

the receiving unit is further configured to receive the content, which is fed back by the second SFE according to the information about the location, of the subresource; and the saving module is configured to save the received content, which is fed back by the second SFE according to the information about the location, of the subresource into the created subresource.

According to the fifth aspect, in a seventh possible implementation manner, the storage unit includes a subresource creation module and a saving module, where the receiving unit is further configured to receive the content, which is returned by the second SFE according to the information about the location, of the resource/subresource;

the subresource creation module is configured to create a corresponding subresource according to the content of the resource/subresource; and the saving module is configured to save the received content, which is fed back by the second SFE according to the information about the location, of the resource/subresource into the created resource/subresource.

According to the second or fifth possible implementation manner, in an eighth possible implementation manner, the apparatus further includes: a declaring unit, where the declaring unit is configured to declare the created resource to an SFE to which the created resource needs to be declared; and the declaring unit is further configured to: after the content, which is fed back by the second SFE according to the information about the location, of the resource/subresource is received and stored, declare the received and stored resource to an SFE to which the received and stored resource needs to be declared.

According to the fifth aspect, in a ninth possible implementation manner, the sending unit is further configured to:

send resource transfer success indication information to the terminal device, where the indication information is used to indicate that the resource/subresource corresponding to the terminal device has been transferred from the second SFE to the first SFE.

According to the ninth possible implementation manner, in a tenth possible implementation manner, the resource transfer success indication information is a response indicating a success of a second resource creation request or a response indicating a success of a resource update request, where the second resource creation request is used to request the first SFE to create a subresource.

According to the fifth aspect, in an eleventh possible implementation manner, the sending unit is specifically configured to:

send, by the first SFE, the resource retrieve request to a fourth SFE, so that the fourth SFE sends the resource retrieve request to the second SFE, where the fourth SFE is a transit SFE with which the first SFE and the second SFE are both registered, and the second SFE is a serving SFE that serves the terminal device before the terminal device changes the SFE serving the terminal device.

According to the eleventh possible implementation manner, in a twelfth possible implementation manner, the receiving unit is further configured to:

receive the content, which is fed back by the second SFE according to the information about the location, of the resource/subresource, where the content is received by the fourth SFE from the second SFE.

According to the fifth aspect or any one of the foregoing twelve possible implementation manners, in a twelfth possible implementation manner, the information about the location includes a save path or a uniform resource identifier URI of the resource/subresource corresponding to the terminal device in the second SFE.

According to a sixth aspect, a resource migration apparatus is provided, where the apparatus includes:

a receiving unit, configured to receive a resource retrieve request sent by a first SFE, where the resource retrieve request includes information about a location of a resource/subresource corresponding to the terminal device in a second SFE; and a sending unit, configured to send a response to the resource retrieve request to the first SFE, where the response includes content, which is returned by the second SFE according to the information about the location, of the resource/subresource.

According to the sixth aspect, in a first possible implementation manner, the receiving unit is further configured to: in a case in which the first SFE does not have rights to retrieve the resource/subresource from the second SFE, receive an access rights update request sent by the terminal device, where the access rights update request is used to request the second SFE to grant the first SFE the rights to retrieve the resource/subresource from the second SFE; and the sending unit is further configured to send a response to the access rights update request to the terminal device.

According to the first possible implementation manner, in a second possible implementation manner, the apparatus further includes a granting unit, where the receiving unit is further configured to receive an access rights retrieve request sent by the terminal device, where the access rights retrieve request is used to determine whether the first SFE has the rights to retrieve the resource/subresource from the second SFE; and the granting unit is configured to grant the first SFE the rights to retrieve the resource/subresource from the second SFE.

According to the sixth aspect or either of the foregoing two possible implementation manners, in a third possible implementation manner, the sending unit is specifically configured to: if the first SFE has the rights to retrieve the resource/subresource from the second SFE, send the response to the resource retrieve request to the first SFE.

According to the sixth aspect, in a fourth possible implementation manner, the receiving unit is further configured to:

in a case in which the second SFE and a third SFE are a same SFE, and the second SFE is an SFE that serves the terminal device before the terminal device changes the SFE serving the terminal device, receive, by the second SFE, a resource deletion request sent by the terminal device, where the request is used to instruct the second SFE to delete the resource corresponding to the terminal device from the second SFE.

According to the sixth aspect, in a fifth possible implementation manner, the receiving unit is further configured to:

in a case in which the second SFE and a third SFE are a same SFE, and the second SFE is an SFE that serves the terminal device before the terminal device changes the SFE serving the terminal device, receive, by the second SFE, an expiration time update request sent by the terminal device, where the expiration time update request is used to update an expiration time of the resource.

According to the sixth aspect, in a sixth possible implementation manner, the apparatus further includes a creation unit and a saving unit, where the receiving unit is further configured to receive content, which is sent by a third SFE, of the resource/subresource corresponding to the terminal device;

the creation unit is configured to create a corresponding resource/subresource according to the content, which is sent by the third SFE, of the resource/subresource corresponding to the terminal device;

the saving unit is configured to save the content, which is sent by the third SFE, of the resource/subresource corresponding to the terminal device into the created resource/subresource; and the sending unit is further configured to send information about a location of the resource/subresource created by the second SFE to the terminal device.

According to the sixth possible implementation manner, in a seventh possible implementation manner, the apparatus further includes a declaring unit, configured to:

in a case in which the resource/subresource corresponding to the terminal device has not been declared in the second SFE, declare, by the third SFE, the resource/subresource corresponding to the terminal device to the second SFE, so that the second SFE creates a declaration resource corresponding to the terminal device.

According to the sixth aspect or any one of the foregoing seven possible implementation manners, in an eighth possible implementation manner, the information about the location includes a save path or a uniform resource identifier URI of the resource/subresource corresponding to the terminal device in the second SFE.

According to the sixth aspect or any one of the foregoing eight possible implementation manners, in a ninth possible implementation manner, the sending unit is further configured to:

in a case in which the second SFE is an SFE that serves the terminal device before the terminal device changes the SFE serving the terminal device, send, to the first SFE, the first identifier and the information about the location of the resource/subresource corresponding to the terminal device in the second SFE, where the first identifier is used to indicate that the terminal device needs to change the SFE serving the terminal device.

According to the resource migration method and apparatus provided in the embodiments of the present invention, a terminal device determines that an SFE serving the terminal device needs to be changed to a first SFE, acquires information about a location of a resource/subresource corresponding to the terminal device in a second SFE, where the second SFE saves a resource/subresource corresponding to a resource terminal device of the terminal device, and sends, to the first SFE, an identifier of the terminal device, a first identifier, and the information about the location of the source/subresource corresponding to the resource terminal device of the terminal device in the second SFE; the first SFE receives the first identifier and the information about the location of the source/subresource corresponding to the resource terminal device of the terminal device in the second SFE, sends a resource retrieve request to the second SFE, where the resource retrieve request includes the information about the location of the source/subresource corresponding to the resource terminal device of the terminal device in the second SFE, and then receives and stores content, which is fed back by the second SFE according to the information about the location, of the resource/subresource; and the second SFE receives the resource retrieve request sent by the first SFE, and sends a response to the resource retrieve request to the first SFE, where the response includes the content, which is fed back by the second SFE according to the information about the location, of the resource/subresource. The SFE serving the terminal device is changed to the first SFE by means of the foregoing operations.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
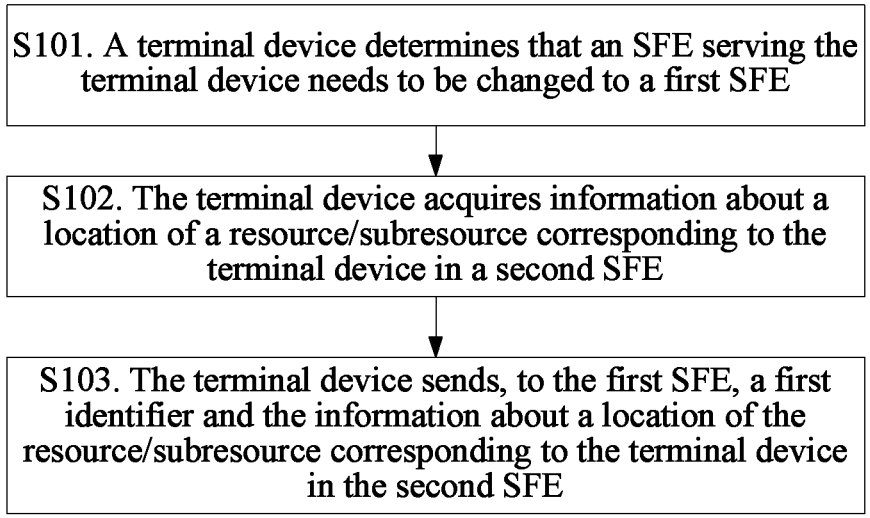
FIG. 1 is a schematic diagram of a resource migration method in the prior art.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A service function entity in the embodiments of the present invention can implement functions of a service capability layer, is a middleware platform located between an application and an underlying network, and can provide a service function for an upper-layer application by using a function exposed by the underlying network.

In the embodiments of the present invention, a terminal device may be a D device, a D' device, or a gateway. A resource or subresource that corresponds to the terminal device and is saved in a serving SFE is an abstraction of information, where the serving SFE serves the terminal device before the terminal device changes the SFE serving the terminal device. Any information that can be named can be used as a resource, for example, a document or a picture, a time-related service, a set of other resources, or a non-virtual object (for example, a person).

Moreover, generally, the resource corresponding to the terminal device may include multiple lower-level resources, and the multiple lower-level resources are collectively referred to as subresources in the embodiments of the present invention. The subresource is a collective term of the multiple lower-level resources subordinate to the resource.

Generally, for example, if a first SFE requests to retrieve an application resource, the first SFE first receives properties (for example, a creation time and an expiration time) of the application resource and a URI of each subresource that is included in the application; then, after receiving the properties of the application resource and the URI of each subresource that is included in the application, the first SFE retrieves a corresponding subresource according to the URI of each subresource that is included in the application, and then receives content of the subresource, where the content of the subresource includes a property of the subresource and specific data that is included in the subresource.

That is, in the embodiments of the present invention, content of the resource corresponding to the terminal device includes: a property of the resource corresponding to the terminal device, and content of a subresource included in the resource corresponding to the terminal device; and content of any subresource included in the resource corresponding to the terminal device includes a property of the subresource and specific data that is included in the subresource.

It should be noted that, in all embodiments of the present invention, the first SFE is an SFE which is determined by the terminal device and to which the SFE serving the terminal device needs to be changed, a second SFE is an SFE that saves the resource/subresource corresponding to the terminal device, a third SFE is a serving SFE that serves the terminal device before the terminal device changes the SFE serving the terminal device, and a fourth SFE is a transit SFE between the first SFE and the third SFE, that is, an SFE with which the first SFE and the third SFE are both registered. In a case in which the first SFE cannot directly communicate with the third SFE, the fourth SFE needs to transfer information between the first SFE and the third SFE, or the third SFE first transfers content, which is saved by the third SFE, of the resource/subresource corresponding to the terminal device to the fourth SFE and then the first SFE acquires the content of the resource/subresource corresponding to the terminal device from the fourth SFE.

The transit SFE may be classified into two types according to different specific functions, where a transit SFE of a first type forwards only information between the first SFE and the third SFE and does not perform other operations, and a transit SFE of a second type needs to save content, which is sent by the third SFE to this transit SFE, of the resource/subresource corresponding to the terminal device.

To sum up, because the second SFE saves the resource/subresource corresponding to the terminal device, the second SFE is probably a serving SFE that serves the terminal device before the terminal device changes the SFE serving the terminal device, that is, the third SFE; or the second SFE is probably a transit SFE, that is, the fourth SFE.

In all embodiments of the present invention, if an execution body is the second SFE, it indicates that the execution body is probably the third SFE or the fourth SFE; if the execution body is the third SFE, it indicates that the execution body can be only a serving SFE that serves the terminal device before the terminal device changes the SFE serving the terminal device; and if the execution body is directly the fourth SFE, it indicates that the execution body can be only a transit SFE.

It should be noted that, any request in the embodiments of the present invention is a functional description about the request but does not particularly refer to a specific request. During specific implementation, a proper specific request may be selected according to the prior art to implement a function that a request in the present invention needs to implement.

A resource migration method according to an embodiment of the present invention is described in detail in the following with reference to the accompanying drawings.

An execution body of this embodiment is a terminal device, and as shown in FIG. 1, specific operations performed by the terminal device are as follows:

S101. The terminal device determines that an SFE serving the terminal device needs to be changed to a first SFE.

Exemplarily, the terminal device may determine, according to a user request or a local policy saved in the terminal, that the SFE serving the terminal device needs to be changed to the first SFE.

S102. The terminal device acquires information about a location of a resource/subresource corresponding to the terminal device in a second SFE.

The second SFE saves the resource/subresource corresponding to the terminal device. Specifically, the information about the location includes a save path or a uniform resource identifier URI of the resource/subresource corresponding to the terminal device in the second SFE.

It should be noted that, in a general case, when the terminal device initially registers with the second SFE, the second SFE sends the information about the location of the resource/subresource corresponding to the terminal device in the second SFE to the terminal device, and the terminal device saves at least the information about the location of the resource corresponding to the terminal device in the second SFE. Optionally, the terminal device may further save the information about the location of the subresource corresponding to the terminal device in the second SFE.

If the terminal device further saves the information about the location of the subresource corresponding to the terminal device in the second SFE, after determining that the SFE serving the terminal device needs to be changed to the first SFE, the terminal device may directly acquire the information about the location of the resource/subresource corresponding to the terminal device in the second SFE.

If the terminal device does not save the information about the location of the subresource corresponding to the terminal device in the second SFE, after determining that the SFE serving the terminal device needs to be changed to the first SFE, the terminal device needs to request, from the second SFE according to the saved information about the location of the resource corresponding to the terminal device in the second SFE, information about a location of a subresource included in the resource corresponding to the terminal device in the second SFE, so as to indirectly acquire the information about the location of the subresource corresponding to the terminal device in the second SFE.

S103. The terminal device sends, to the first SFE, a first identifier and the information about the location of the resource/subresource corresponding to the terminal device in the second SFE.

The first identifier is used to indicate that the terminal device needs to change the SFE serving the terminal device, so that the first SFE transfers, after receiving the first identifier, the resource/subresource corresponding to the terminal device from the second SFE to the first SFE.

Optionally, before the terminal device sends, to the first SFE, the first identifier and the information about the location of the resource/subresource corresponding to the terminal device in the second SFE, the method may further include:

sending, by the terminal device, a first resource creation request to the first SFE, where the first resource creation request is used to enable the first SFE to create a resource according to the first resource creation request, the first resource creation request does not carry the first identifier and the information about the location of the resource/subresource corresponding to the terminal device in the second SFE; and receiving, by the terminal device, a response to the first resource creation request, where the response is sent by the first SFE; and the sending, to the first SFE, a first identifier and the information about the location of the resource/subresource corresponding to the terminal device in the second SFE includes:

in a case in which the response indicates that resource creation succeeds, sending, to the first SFE, the first identifier and the information about the location of the resource/subresource corresponding to the terminal device in the second SFE.

Alternatively, optionally, the sending, to the first SFE, a first identifier and the information about the location of the resource/subresource corresponding to the terminal device in the second SFE includes:

sending, by the terminal device, a first resource creation request to the first SFE, where the first resource creation request carries the first identifier and the information about the location of the resource/subresource corresponding to the terminal device in the second SFE.

Optionally, the method may further include:

sending, by the terminal device, an access rights retrieve request to the second SFE, where the access rights retrieve request is used to determine whether the first SFE has rights to retrieve the resource/subresource from the second SFE;

receiving, by the terminal device from the second SFE, a response to the access rights retrieve request, and if the response to the access rights retrieve request indicates that the first SFE does not have the rights to access the second SFE, sending, by the terminal device, an access rights update request to the second SFE, where specifically, the access rights update request is used to instruct the second SFE to grant the first SFE the rights to access the resource/subresource in the second SFE; and receiving, from the second SFE, a response to the access rights update request.

Alternatively, optionally, the method further includes:

receiving resource transfer success indication information sent by the first SFE, where the indication information is used to indicate that the resource/subresource corresponding to the terminal device has been transferred from the second SFE to the first SFE; optionally, the resource transfer success indication information may be a response to a second resource creation request or a response to a resource update request, where the second resource creation request is used to request the first SFE to create a subresource; and sending a resource deletion request or a resource update request to the third SFE, where the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

It should be noted that, the third SFE is a serving SFE that serves the terminal device before the terminal device changes the SFE serving the terminal device. When the second SFE and the third SFE are different SFEs, that is, when the second SFE is a transit SFE, the resource deletion request does not need to be sent to the second SFE and this request needs to be sent to only the third SFE. After a resource in the third SFE is deleted, a resource in the second SFE is automatically deleted.

Specifically, the resource transfer success indication information may be a response indicating a success of the second resource creation request, or a response indicating a success of the resource update request.

Optionally, if the second SFE and the third SFE are different SFEs, and the third SFE is a serving SFE that serves the terminal device before the terminal device changes the SFE serving the terminal device, and after the terminal device determines that the SFE serving the terminal device needs to be changed to the first SFE, the method further includes:

sending, by the terminal device, the first identifier to the third SFE, so that the third SFE sends the resource/subresource corresponding to the terminal device to the second SFE; and receiving the information about the location of the resource corresponding to the terminal device in the second SFE, where the information about the location is sent by the second SFE.

It should be noted that, in this case, the terminal device may send only the first identifier to the third SFE, and may not provide information about a location of the resource/subresource corresponding to the terminal device in the third SFE; because the third SFE is a serving SFE that serves the terminal device before the terminal device changes the SFE serving the terminal device, the third SFE may acquire, according to information such as an identifier of the terminal device, the information about the location of the resource/subresource corresponding to the terminal device in the third SFE, and then obtains the resource/subresource corresponding to the terminal device.

Figure 2:
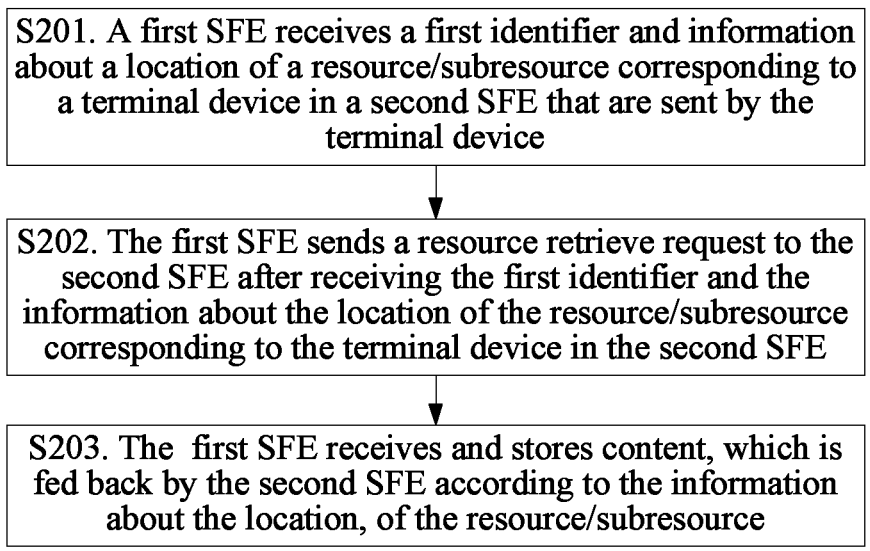
FIG. 2 is a schematic diagram of another resource migration method according to an embodiment of the present invention.

An embodiment of the present invention further provides another resource migration method, and an execution body of this embodiment is a first SFE. As shown in FIG. 2, specific operations are as follows:

S201. The first SFE receives a first identifier and information about a location of a resource/subresource corresponding to the terminal device in a second SFE.

The first identifier is used to indicate that the terminal device needs to change an SFE serving the terminal device.

Optionally, the first identifier and the information about the location of the resource/subresource corresponding to the terminal device in the second SFE that are received by the first SFE may be sent by the terminal device to the first SFE; or may be sent, to the first SFE, by a serving SFE that serves the terminal device before the terminal device changes the SFE serving the terminal device.

S202. The first SFE sends a resource retrieve request to the second SFE after receiving the first identifier and the information about the location of the resource/subresource corresponding to the terminal device in the second SFE.

The resource retrieve request includes the information about the location of the resource/subresource corresponding to the terminal device in the second SFE.

S203. The first SFE receives and stores content, which is fed back by the second SFE according to the information about the location, of the resource/subresource.

Optionally, before the first SFE receives the first identifier and the information about the location of the resource/subresource corresponding to the terminal device in the second SFE, the method further includes:

receiving, by the first SFE, a first resource creation request, and creating a corresponding resource according to the first resource creation request; and sending a response to the first resource creation request to the terminal device after resource creation is ended.

The receiving, by the first SFE, a first identifier and information about a location of a resource/subresource corresponding to the terminal device in a second SFE includes:

in a case in which the response to the first resource creation request indicates that the resource creation succeeds, receiving a resource transfer request, where the resource transfer request carries the first identifier and the information about the location of the resource/subresource corresponding to the terminal device in the second SFE.

It should be noted that, the resource transfer request is merely a functional description but does not particularly refer to an actual request. Exemplarily, the resource transfer request may be a second resource creation request, or may a resource update request, where the second resource creation request is used to request the first SFE to create a subresource.

Specifically, the receiving, by the first SFE, a first identifier and information about a location of a resource/subresource corresponding to the terminal device in a second SFE includes:

receiving a first resource creation request, where the first resource creation request carries the first identifier and the information about the location of the resource/subresource corresponding to the terminal device in the second SFE; and creating a resource according to the first resource creation request.

Optionally, if the first SFE receives the information about the location of the subresource of the terminal device in the second SFE, the receiving and storing content, which is fed back by the second SFE according to the information about the location, of the subresource includes:

creating a subresource according to the information about the location of the subresource of the terminal device in the second SFE; and receiving the content, which is fed back by the second SFE according to the information about the location, of the subresource, and saving the received content into the created subresource.

Alternatively, optionally, the receiving and storing content, which is fed back by the second SFE according to the information about the location, of the resource/subresource includes:

receiving the content, which is fed back by the second SFE according to the information about the location, of the resource/subresource;

creating a subresource according to the content, which is fed back by the second SFE according to the information about the location, of the resource/subresource; and saving the received content, which is fed back by the second SFE according to the information about the location, of the resource/subresource into the created resource/subresource.

Optionally, after the creating a resource according to the first resource creation request, the method further includes: declaring, by the first SFE, the resource/subresource that corresponds to the terminal device and is created in the first SFE to an SFE to which the resource needs to be declared.

After the receiving and storing content, which is fed back by the second SFE according to the information about the location, of the resource/subresource, the method further includes: requesting, by the first SFE, the SFE to which the resource needs to be declared to update the declared resource corresponding to the terminal device.

Optionally, the method further includes: sending resource transfer success indication information to the terminal device, where the indication information is used to indicate that the resource/subresource corresponding to the terminal device has been transferred from the second SFE to the first SFE. Optionally, the resource transfer success indication information may be a response indicating a success of a second resource creation request or a response indicating a success of a resource update request, and the second resource creation request is used to request the first SFE to create a subresource.

Specifically, the sending a resource retrieve request to the second SFE includes: sending, by the first SFE, the resource retrieve request to a fourth SFE, and sending, by the fourth SFE, the resource retrieve request to the second SFE.

The receiving and storing content, which is fed back by the second SFE according to the information about the location, of the resource/subresource includes: receiving the content, which is fed back by the second SFE according to the information about the location, of the resource/subresource, where the content is received by the fourth SFE from the second SFE.

It should be noted that, the foregoing case is that: the second SFE and the third SFE are a same SFE, and the first SFE cannot directly communicate with the second SFE and a transit SFE (the fourth SFE) needs to transfer information between the first SFE and the second SFE.

Figure 3:
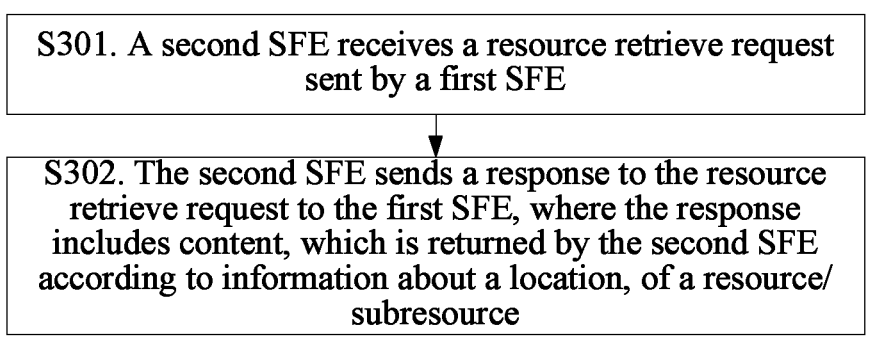
FIG. 3 is a schematic diagram of another resource migration method according to an embodiment of the present invention.

An embodiment of the present invention further provides another resource migration method, and an execution body of this embodiment is a second SFE. As shown in FIG. 3, specific operations are as follows:

S301. The second SFE receives a resource retrieve request sent by a first SFE.

Specifically, the resource retrieve request includes information about a location of a resource/subresource corresponding to the terminal device in the second SFE.

The information about the location may be a save path or a uniform resource identifier URI of the resource/subresource corresponding to the terminal device in the second SFE.

S302. The second SFE sends a response to the resource retrieve request to the first SFE, where the response includes content, which is returned by the second SFE according to the information about the location, of the resource/subresource.

Optionally, the method may further include: receiving, by the second SFE, an access rights retrieve request sent by the terminal device, where the access rights retrieve request is used to check whether the first SFE has rights to retrieve the resource/subresource from the second SFE; and if the first SFE does not have the rights to retrieve the resource/subresource from the second SFE, receiving an access rights update request sent by the terminal device, granting the first SFE the rights to retrieve the resource/subresource from the second SFE, and sending a response to the access rights update request to the terminal device.

Specifically, the sending a response to the resource retrieve request to the first SFE includes: if the first SFE has the rights to retrieve the resource/subresource from the second SFE, sending, by the second SFE, the response to the resource retrieve request to the first SFE.

Optionally, the method may further include: if the second SFE and a third SFE are a same SFE, and the third SFE is an SFE that serves the terminal device before the terminal device changes the SFE serving the terminal device, receiving, by the second SFE, a resource deletion request sent by the terminal device, where the request is used to instruct the second SFE to delete the resource corresponding to the terminal device from the second SFE.

Alternatively, optionally, the method may further include: if the second SFE and a third SFE are a same SFE, and the third SFE is an SFE that serves the terminal device before the terminal device changes the SFE serving the terminal device, receiving, by the second SFE, an expiration time update request sent by the terminal device, where the expiration time update request is used to update an expiration time of the resource.

Optionally, if the second SFE, and a third SFE are different SFEs, and the third SFE is an SFE that serves the terminal device before the terminal device changes the SFE serving the terminal device, and if the resource/subresource corresponding to the terminal device has been declared in the second SFE, before the receiving a resource retrieve request sent by a first SFE, the method further includes:

receiving content, which is sent by the third SFE, of the resource/subresource corresponding to the terminal device;

creating a resource/subresource according to the content, which is sent by the third SFE, of the resource/subresource corresponding to the terminal device;

saving the content, which is sent by the third SFE, of the resource/subresource corresponding to the terminal device into the created resource/subresource; and sending information about a location of the resource/subresource created by the second SFE to the terminal device.

Optionally, if the second SFE is an SFE that serves the terminal device before the terminal device changes the SFE serving the terminal device, the method further includes:

sending, to the first SFE, a first identifier and the information about the location of the resource/subresource corresponding to the terminal device in the second SFE, where the first identifier is used to indicate that the terminal device needs to change the SFE serving the terminal device.

It should be noted that, the foregoing case is that, the second SFE is a transit SFE; the third SFE is an SFE that serves the terminal device before the terminal device changes the SFE serving the terminal device; the second SFE and the third SFE are different SFEs; and the first SFE cannot directly communicate with the third SFE, content, which is saved in the third SFE, of the resource/subresource corresponding to the terminal device is transferred to the second SFE for storage, and then the first SFE retrieves the content of the resource/subresource corresponding to the terminal device from the second SFE.

Further, optionally, if the resource/subresource corresponding to the terminal device has not been declared in the second SFE, the method further includes:

declaring, by the third SFE, the resource/subresource corresponding to the terminal device to the second SFE, so that the second SFE creates a declaration resource corresponding to the terminal device.

The present invention further provides an embodiment of another resource migration method. This embodiment mainly describes a case in which a terminal device knows which subresources included in a resource corresponding to the terminal device need to be transferred from an SFE currently serving the terminal device; moreover, in this embodiment, the SFE currently serving the terminal device is a second SFE, where the second SFE and a third SFE, are a same SFE; a fourth SFE is a transit SFE of a first type; the terminal device cannot determine whether a first SFE has rights to retrieve a resource/subresource from the second SFE and therefore the second SFE needs to verify whether the first SFE has the rights to retrieve the resource/subresource from the second SFE.

It should be noted that, if the first SFE cannot directly communicate with the second SFE, a fourth SFE is needed between the first SFE and the second SFE to forward information between the first SFE and the second SFE. The fourth SFE must be able to communicate with both the first SFE and the second SFE to implement a function of forwarding the information between the first SFE and the second SFE. For brevity, in this embodiment, in processes in which the first SFE sends information to the second SFE or receives information sent by the second SFE, and the second SFE sends information to the first SFE or receives information sent by the first SFE, transit operations are not described in detail.

Figure 4:
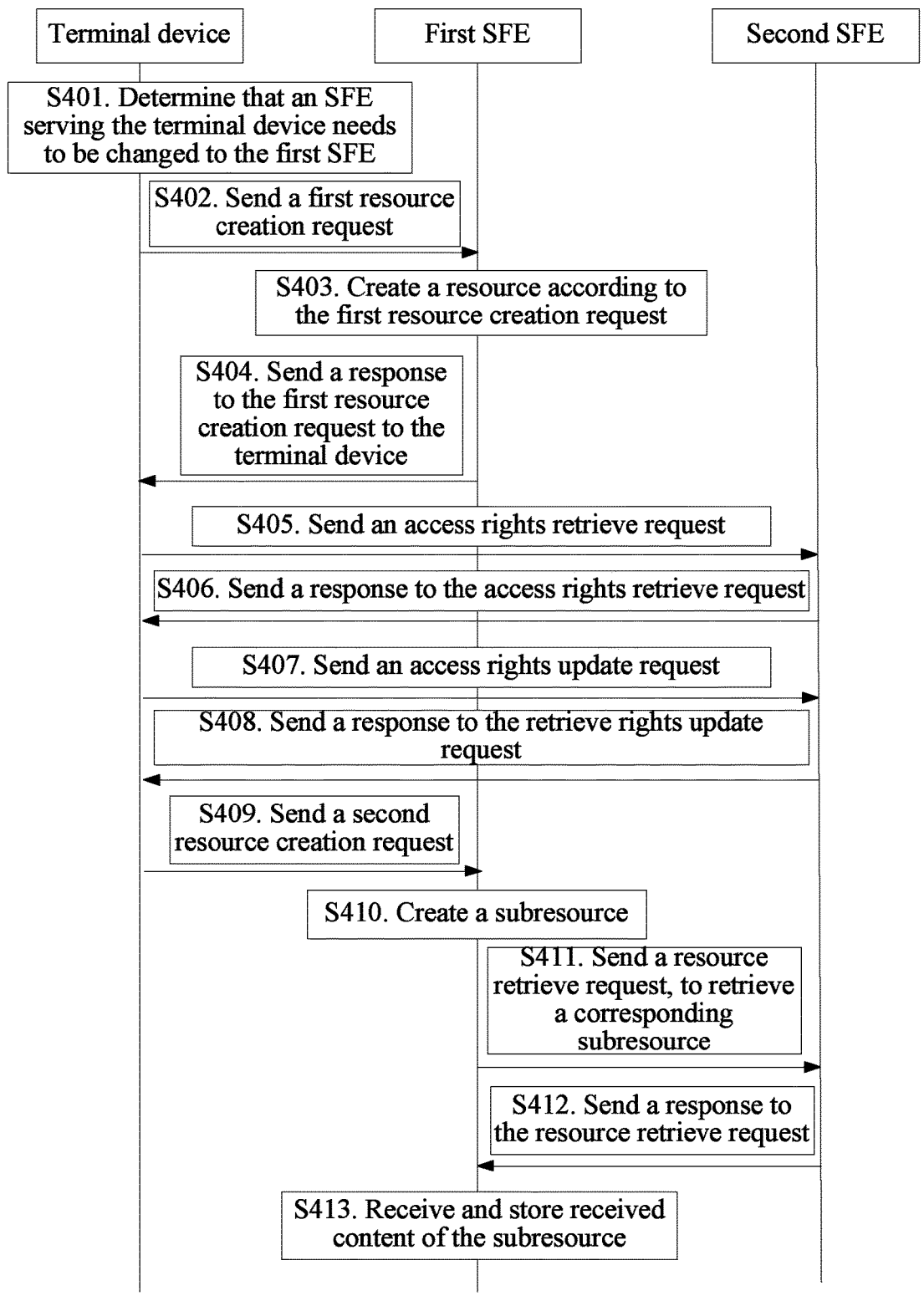
FIG. 4 is a schematic diagram of another resource migration method according to an embodiment of the present invention.

As shown in FIG. 4, specific steps are as follows:

S401. A terminal device determines that an SFE serving the terminal device needs to be changed to a first SFE.

Exemplarily, the terminal device may determine, according to a user indication, or signal strength detected by the terminal device, or a local policy saved in the terminal device, that the SFE serving the terminal device needs to be changed to the first SFE.

Moreover, the terminal device acquires information about a location of a resource/subresource corresponding to the terminal device in a second SFE, where the second SFE saves the resource/subresource corresponding to the terminal device.

Exemplarily, the information about the location of the resource/subresource corresponding to the terminal device in the second SFE may be a uniform resource identifier (URI, Universal Resource Identity) of the resource/subresource in the second SFE. Exemplarily, a URI of an SFE can indicate the SFE, and a URI of a resource/subresource can indicate an SFE in which the resource/subresource is located and indicate a specific resource/subresource in the SFE.

Alternatively, the information about the location of the resource/subresource corresponding to the terminal device in the second SFE may also be save path information of the resource/subresource in the second SFE.

S402. The terminal device sends a first resource creation request to the first SFE.

The first resource creation request is used to request the first SFE to create a resource according to the first resource creation request. If the terminal device is a D device, the resource that needs to be created is an SFE resource, and exemplarily, the first resource creation request may be a create SFE resource request. If the terminal device is a D' device, the resource that needs to be created is an application application resource, and exemplarily, the first resource creation request may be an application Create Request Indication.

For the D device, before the device changes a service function entity serving the device, the D device saves a globally unique SFE identifier (SFE ID). For the D' device, the device may save a globally unique application identifier (application ID); or may not save a globally unique application ID, and in this case, the first SFE allocates a globally unique application ID to the device.

To sum up, if the terminal device is a D device, an SFE ID of the D device is carried in the first resource creation request sent to the first SFE. If the terminal device is a D' device and if the D' device saves an application ID of the D' device, the application ID of the D' device may be carried in the foregoing request; and if the D' device does not save the application ID of the D' device, the first SFE allocates a globally unique application ID to the D' device after receiving the foregoing first resource creation request, where the application ID is carried in a response to the first resource creation request.

S403. The first SFE creates a resource according to the first resource creation request.

In this embodiment, the first resource creation request does not carry a first identifier and the information about the location of the resource/subresource corresponding to the terminal device in the second SFE.

S404. The first SFE sends a response to the first resource creation request to the terminal device.

When the first SFE creates the resource according to the first resource creation request, whether the terminal device has rights to create a corresponding resource needs to be verified; if yes, the first SFE creates the resource according to the first resource creation request and indicates a resource creation success in the response to the first resource creation request; otherwise, indicates a resource creation failure in the response to the first resource creation request.

Optionally, if the first SFE successfully creates the resource, the first SFE may further declare the created resource in an SFE to which the resource needs to be declared.

S405. The terminal device sends an access rights retrieve request to the second SFE.

The access rights retrieve request is used to determine whether the first SFE has rights to retrieve the resource/subresource from the second SFE, and exemplarily, the access rights retrieve request may be an access Rights Retrieve Request Indication.

S406. The second SFE sends a response to the access rights retrieve request to the terminal device.

Exemplarily, the response to the access rights retrieve request may be an access Rights Retrieve Response Confirm.

If the response, which is sent by the second SFE to the terminal device, to the access rights retrieve request indicates that the first SFE does not have the rights to retrieve the resource/subresource from the second SFE, the following operations are performed:

S407. The terminal device sends an access rights update request to the second SFE.

Exemplarily, the access rights update request may be an access Rights Update Request Indication, and the retrieve rights update request is used to instruct the second SFE to grant the first SFE the rights to retrieve the resource/subresource from the second SFE.

Exemplarily, the second SFE may add the first SFE to a retrieve-allowed list, and therefore, in this case, the retrieve rights update request may carry an identifier or a URI of the first SFE.

S408. The second SFE sends a response to the retrieve rights update request to the terminal device.

Exemplarily, the response to the retrieve rights update request may be an access Rights Update Response Confirm.

The response to the retrieve rights update request indicates that the second SFE of the terminal device has granted the first SFE the rights to access the second SFE.

S409. The terminal device sends a second resource creation request to the first SFE.

The second resource creation request is used to request the first SFE to create a subresource. Exemplarily, if the subresource that needs to be created is a subresource container of lower-level resource containers containers included in an SFE resource that is created by the D device in the first SFE, the second resource creation request is a container Create Request Indication.

The second resource creation request includes the first identifier and the information about the location of the subresource of the terminal device in the second SFE.

The first identifier is used to indicate that the terminal device needs to change the SFE serving the terminal device, that is, the creation of the subresource is caused because the terminal device needs to change the SFE serving the terminal device. That is, the second resource creation request is used to instruct the first SFE to initiate a subresource transfer process, that is, instruct the first SFE to transfer the subresource corresponding to the terminal device from the second SFE to the first SFE.

S410. The first SFE creates a subresource.

In this embodiment, the terminal device knows which subresources need to be transferred to the first SFE. Therefore, by sending the second resource creation request to the first SFE, the terminal device enables the first SFE to create the subresource in advance according to the first identifier and the information about the location of the subresource of the terminal device in the second SFE, where the information about the location is carried in the second resource creation request.

S411. The first SFE sends a resource retrieve request to the second SFE, to retrieve a corresponding subresource.

The resource retrieve request includes the information about the location of the subresource of the terminal device in the second SFE.

S412. The second SFE sends a response to the resource retrieve request to the first SFE.

The second SFE sends the response to the resource retrieve request to the first SFE, where the response includes content of the subresource of the terminal device.

S413. The first SFE receives and stores received content of the subresource.

The first SFE saves received content, which is fed back by the second SFE according to the information about the location, of the subresource into the created subresource.

Optionally, after the first SFE receives and stores the content, which is fed back by the second SFE according to the information about the location, of the subresource, the first SFE may further request the SFE to which the resource needs to be declared to update the declared resource corresponding to the terminal device.

Optionally, the first SFE may further send a response to the second resource creation request to the terminal device, where the response to the second resource creation request is used to indicate that the subresource of the terminal device has been transferred from the second SFE to the first SFE.

Further, optionally, the terminal device may further send a resource deletion request to the second SFE after receiving resource transfer success indication information sent by the first SFE, where the resource deletion request is used to instruct the second SFE to delete the resource corresponding to the terminal device; or the terminal device may further send a resource update request to the second SFE after receiving resource transfer success indication information sent by the first SFE, to update an expiration time of the subresource of the terminal device in the second SFE, so that the second SFE deletes a subresource related to the terminal device after the subresource related to the terminal device expires.

It should be noted herein that, the resource deletion request or the resource update request actually needs to be sent to an SFE that serves the terminal device before the terminal device changes the SFE serving the terminal device, that is, to a third SFE. However, in this embodiment, the second SFE and the third SFE are a same SFE, and therefore, the foregoing directly describes that the resource deletion request or the resource update request is sent to the second SFE.

By using the resource migration method provided in the foregoing embodiment, the terminal device can change, according to a specific condition, the SFE serving the terminal device.

The present invention further provides an embodiment of another resource migration method. This embodiment mainly describes that a terminal device does not know which subresources included in a resource corresponding to the terminal device need to be transferred from an SFE currently serving the terminal device but only knows that a resource corresponding to the terminal device needs to be transferred from the SFE currently serving the terminal device; moreover, in this embodiment, a second SFE and a third SFE are a same SFE, and the terminal device can determine whether a first SFE has rights to retrieve a resource from the second SFE and therefore the second SFE does not need to verify whether the first SFE has the rights to retrieve the resource/subresource from the second SFE.

It should be noted that, if the first SFE cannot directly communicate with the second SFE, a fourth SFE is needed between the first SFE and the second SFE to forward information between the first SFE and the second SFE. The fourth SFE must be able to communicate with both the first SFE and the second SFE to implement a function of forwarding the information between the first SFE and the second SFE. For brevity, in this embodiment, in processes in which the first SFE sends information to the second SFE or receives information sent by the second SFE, and the second SFE sends information to the first SFE or receives information sent by the first SFE, transit operations are not described in detail.

Figure 5:
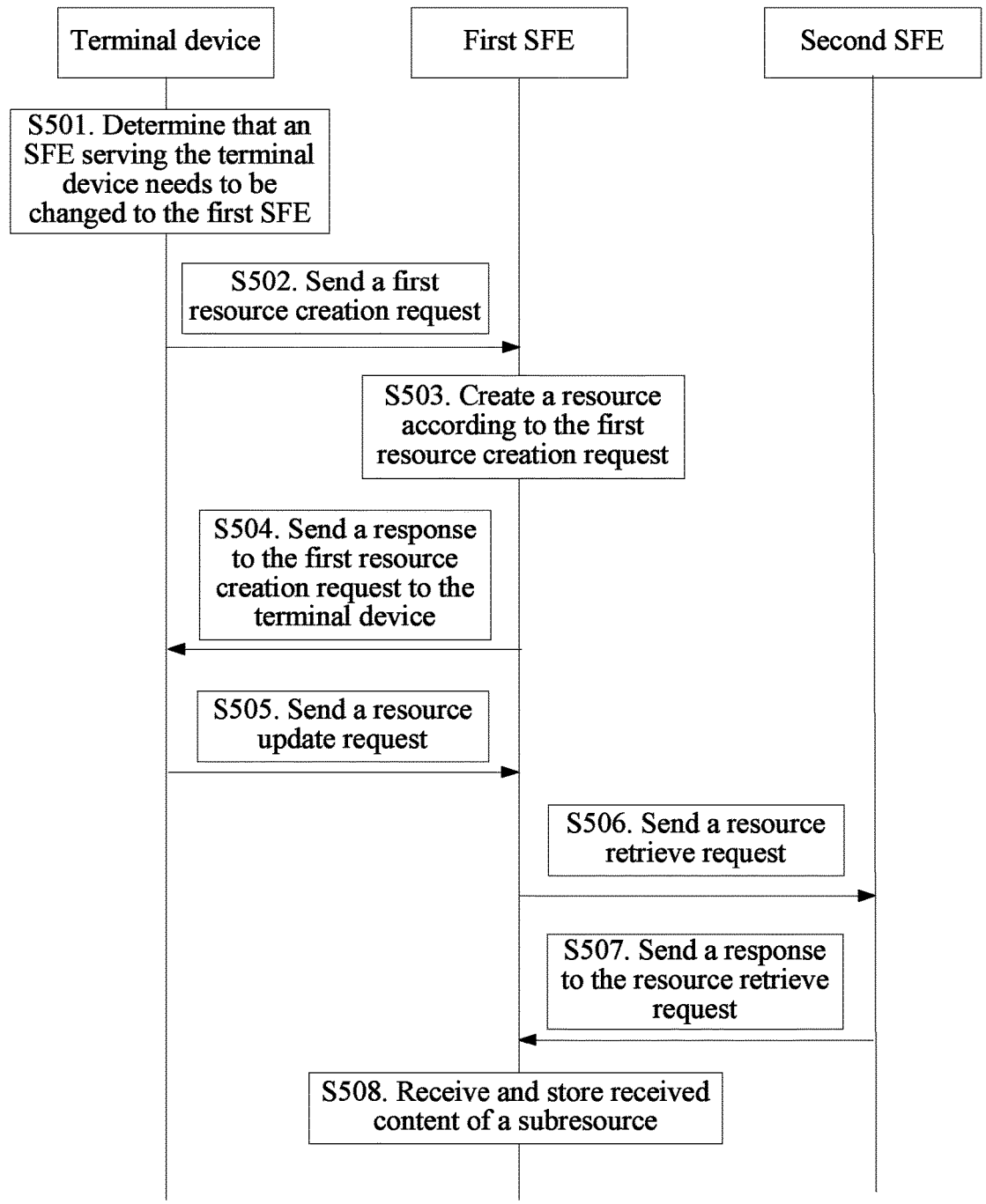
FIG. 5 is a schematic diagram of another resource migration method according to an embodiment of the present invention.

As shown in FIG. 5, specific steps are as follows:

S501. A terminal device determines that an SFE serving the terminal device needs to be changed to a first SFE.

Moreover, the terminal device acquires information about a location of a resource corresponding to the terminal device in a second SFE, where the second SFE saves the resource corresponding to the terminal device.

Exemplarily, the information about the location of the resource corresponding to the terminal device in the second SFE may be a URI of the resource in the second SFE.

S502. The terminal device sends a first resource creation request to the first SFE.

The first resource creation request is used to request the first SFE to create a resource according to the first resource creation request. Specifically, S502 is the same as S402, and details are not described herein.

S503. The first SFE creates a resource according to the first resource creation request.

Specifically, S503 is the same as S403, and details are not described herein.

S504. The first SFE sends a response to the first resource creation request to the terminal device.

Specifically, S504 is the same as S404, and details are not described herein.

S505. The terminal device sends a resource update request to the first SFE.

Exemplarily, the resource update request may be an application Update Request Indication. The resource update request carries a first identifier and the information about the location of the resource corresponding to the terminal device in the second SFE. That is, the resource update request is used to instruct the first SFE to initiate a resource transfer process, that is, instruct the first SFE to transfer the resource corresponding to the terminal device from the second SFE to the first SFE.

S506. The first SFE sends a resource retrieve request to the second SFE.

Exemplarily, the resource retrieve request may be an application Retrieve Request Indication.

In this case, because the terminal device does not know which subresources need to be transferred from the SFE currently serving the terminal device but only knows that a resource needs to be transferred from the SFE currently serving the terminal device, only the information about the location of the resource corresponding to the terminal device in the second SFE can be provided for the first SFE. Because which subresources are included in the resource that corresponds to the terminal device and is saved in the second SFE are not known, the first SFE cannot immediately create a subresource after receiving the resource update request.

The resource retrieve request includes the information about the location of the resource corresponding to the terminal device in the second SFE.

S507. The second SFE sends a response to the resource retrieve request to the first SFE.

Exemplarily, the response to the resource retrieve request may be an application Retrieve Response Confirm.

First, the second SFE needs to know whether the first SFE has rights to retrieve a resource, and a specific method is described in S412, which is not described in detail herein.

Then, the second SFE sends the response to the resource retrieve request to the first SFE, where the response includes content of the resource corresponding to the terminal device. It should be noted herein that, the resource corresponding to the terminal device may include one or more subresources. If the resource corresponding to the terminal device probably includes a few subresources, it may be sent to the first SFE by using the response to the resource retrieve request, and therefore, the response to the resource retrieve request includes the content of the resource corresponding to the terminal device. Therefore, the response needs to include content of all subresources included in the resource corresponding to the terminal device.

If the resource corresponding to the terminal device probably includes if the resource corresponding to the terminal device probably includes many subresources, content of the resource corresponding to the terminal device cannot be all fed back to the first SFE at one time by using one response to the resource retrieve request, and the content of the resource corresponding to the terminal device needs to be fed back many times by using at least two responses to the resource retrieve request, that is, S507 probably needs to be repeated at least twice. The specific number of times is determined according to the number of and content of subresources included in the resource corresponding to the terminal device.

S508. The first SFE receives and stores received content of the subresource.

The first SFE first creates a same subresource according to received content, which is fed back by the second SFE, of the resource, and then saves the received content, which is fed back by the second SFE, of the subresource into the created subresource.

If S507 is repeated many times, S508 also needs to be repeated the same number of times as S507 to transfer all resources corresponding to the terminal device.

Optionally, the first SFE may further send a response to the resource update request to the terminal device, and exemplarily, the response to the resource update request may be an application Update Response Confirm. The response to the resource update request is used to indicate that the subresource of the terminal device has been transferred from the second SFE to the first SFE.

Further, optionally, the terminal device may further send a resource deletion request to the second SFE after receiving resource transfer success indication information sent by the first SFE, where the resource deletion request is used to instruct the second SFE to delete the resource corresponding to the terminal device; or the terminal device may further send a resource update request to the second SFE after receiving resource transfer success indication information sent by the first SFE, to update an expiration time of the subresource of the terminal device in the second SFE, so that the second SFE deletes a subresource related to the terminal device after the subresource related to the terminal device expires.

It should be noted herein that, the resource deletion request or the resource update request actually needs to be sent to an SFE that serves the terminal device before the terminal device changes the SFE serving the terminal device, that is, to a third SFE. However, in this embodiment, the second SFE and the third SFE are a same SFE, and therefore, the foregoing directly describes that the resource deletion request or the resource update request is sent to the second SFE.

By using the resource migration method provided in the foregoing embodiment, the terminal device can change, according to a specific condition, the SFE serving the terminal device.

The present invention further provides an embodiment of another resource migration method. This embodiment mainly describes that a terminal device knows which subresources included in a resource corresponding to the terminal device need to be transferred from an SFE currently serving the terminal device; and in this embodiment, a second SFE and a third SFE are a same SFE, and the terminal device can determine whether a first SFE has rights to retrieve a resource from the second SFE and therefore the second SFE does not need to verify whether the first SFE has the rights to retrieve a subresource from the second SFE.

It should be noted that, if the first SFE cannot directly communicate with the third SFE, a fourth SFE is needed between the first SFE and the second SFE to forward information between the first SFE and the second SFE. The fourth SFE must be able to communicate with both the first SFE and the second SFE to implement a function of forwarding the information between the first SFE and the second SFE. For brevity, in this embodiment, in processes in which the first SFE sends information to the second SFE or receives information sent by the second SFE, and the second SFE sends information to the first SFE or receives information sent by the first SFE, transit operations are not described in detail.

Figure 6:
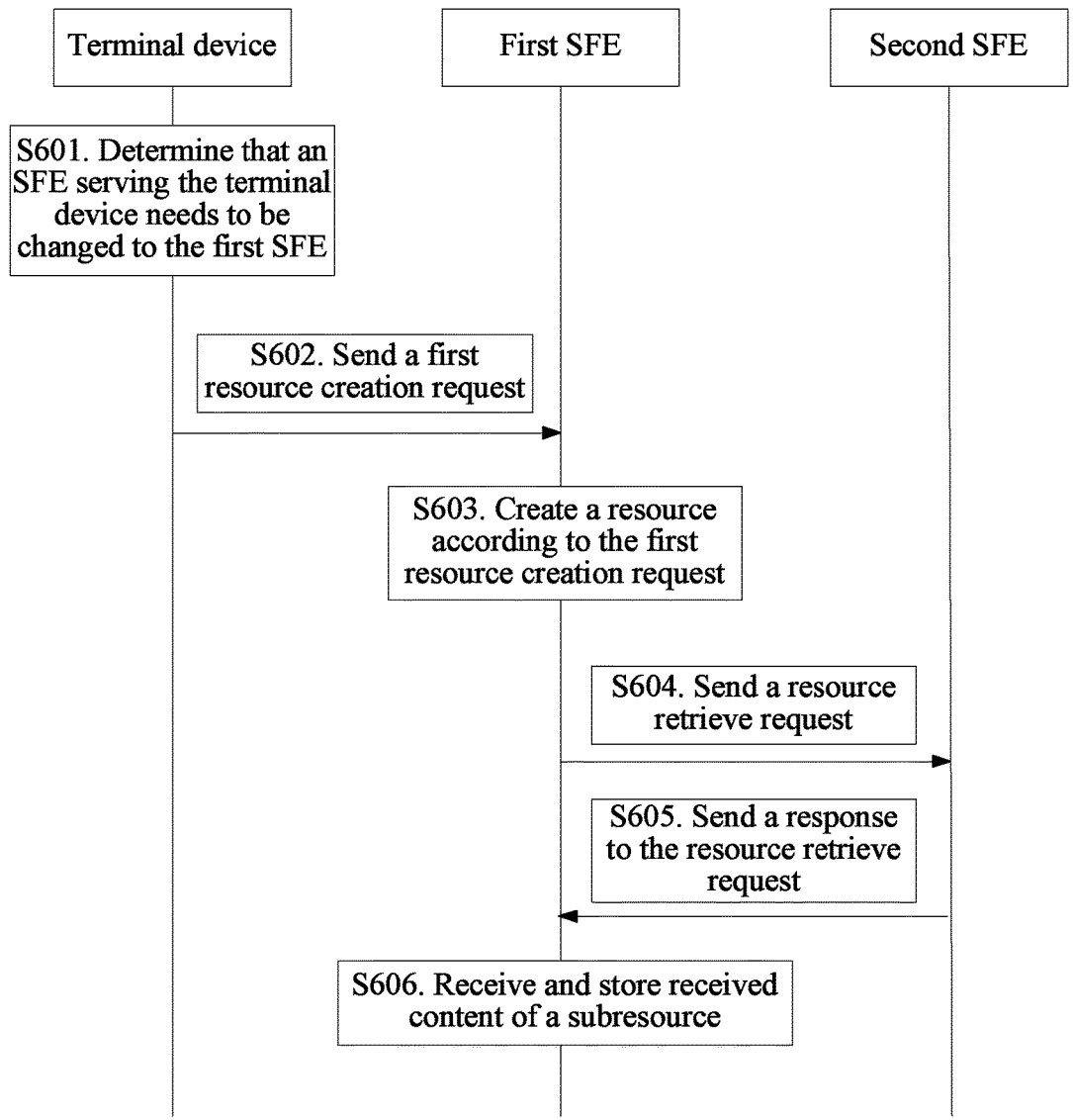
FIG. 6 is a schematic diagram of another resource migration method according to an embodiment of the present invention.

As shown in FIG. 6, specific steps are as follows:

S601. A terminal device determines that an SFE serving the terminal device needs to be changed to a first SFE.

Moreover, the terminal device acquires information about a location of a subresource of the terminal device in a second SFE, where the second SFE saves the subresource related to the terminal device.

S602. The terminal device sends a first resource creation request to the first SFE.

The first resource creation request is used to request the first SFE to create a resource according to the first resource creation request. Specifically, the first resource creation request carries a first identifier and the information about the location of the subresource of the terminal device in the second SFE, and further, may further carry an identifier of the terminal device.

If the terminal device is a D device, the resource that needs to be created is an SFE resource, and exemplarily, the first resource creation request may be an SFE Create Request Indication; and if the terminal device is a D' device, the resource that needs to be created is an application application resource, and exemplarily, the first resource creation request may be an application Create Request Indication.

S603. The first SFE creates a resource according to the first resource creation request.

S604. The first SFE sends a resource retrieve request to the second SFE.

The first SFE creates the resource according to the first resource creation request, and may know, according to the first identifier carried in the first resource creation request, that the creation of the resource is caused because the terminal device needs to change the SFE serving the terminal device. Therefore, the first SFE directly sends the resource retrieve request to the second SFE, where the resource retrieve request carries the information about the location of the subresource of the terminal device in the second SFE.

S605. The second SFE sends a response to the resource retrieve request to the first SFE.

First, the second SFE needs to know whether the first SFE has rights to retrieve a resource, and a specific operation is the same as the related operation in S412, which is not described in detail herein.

Then, the second SFE sends the response to the resource retrieve request to the first SFE, where the response includes content of the subresource of the terminal device.

S606. The first SFE receives and stores received content of the subresource.

Specifically, the first SFE first creates a subresource according to received content, which is fed back by the second SFE, of the subresource, and then saves the received content, which is fed back by the second SFE, of the subresource into the created subresource.

Optionally, the first SFE may further send resource transfer success indication information to the terminal device, where the resource transfer success indication information is used to indicate that the subresource of the terminal device has been transferred from the second SFE to the first SFE.

Further, optionally, the terminal device may further send a resource deletion request to the second SFE after receiving a response to the first resource creation request, where the resource deletion request is used to instruct the second SFE to delete the resource corresponding to the terminal device; or the terminal device may further send a resource update request to the second SFE after receiving resource transfer success indication information sent by the first SFE, to update an expiration time of the subresource of the terminal device in the second SFE, so that the second SFE deletes a subresource related to the terminal device after the subresource related to the terminal device expires.

It should be noted herein that, the resource deletion request or the resource update request actually needs to be sent to an SFE that serves the terminal device before the terminal device changes the SFE serving the terminal device, that is, to a third SFE. However, in this embodiment, the second SFE and the third SFE are a same SFE, and therefore, the foregoing directly describes that the resource deletion request or the resource update request is sent to the second SFE.

By using the resource migration method provided in the foregoing embodiment, the terminal device can change, according to a specific condition, the SFE serving the terminal device.

The present invention further provides an embodiment of another resource migration method. This embodiment mainly differs from the foregoing embodiment in that, a third SFE and a second SFE are different SFEs, and the second SFE in this embodiment is a transit SFE, that is, a first SFE cannot directly communicate with the third SFE; therefore, content of a resource/subresource corresponding to a terminal device first needs to be transferred to a fourth SFE.

Figure 7:
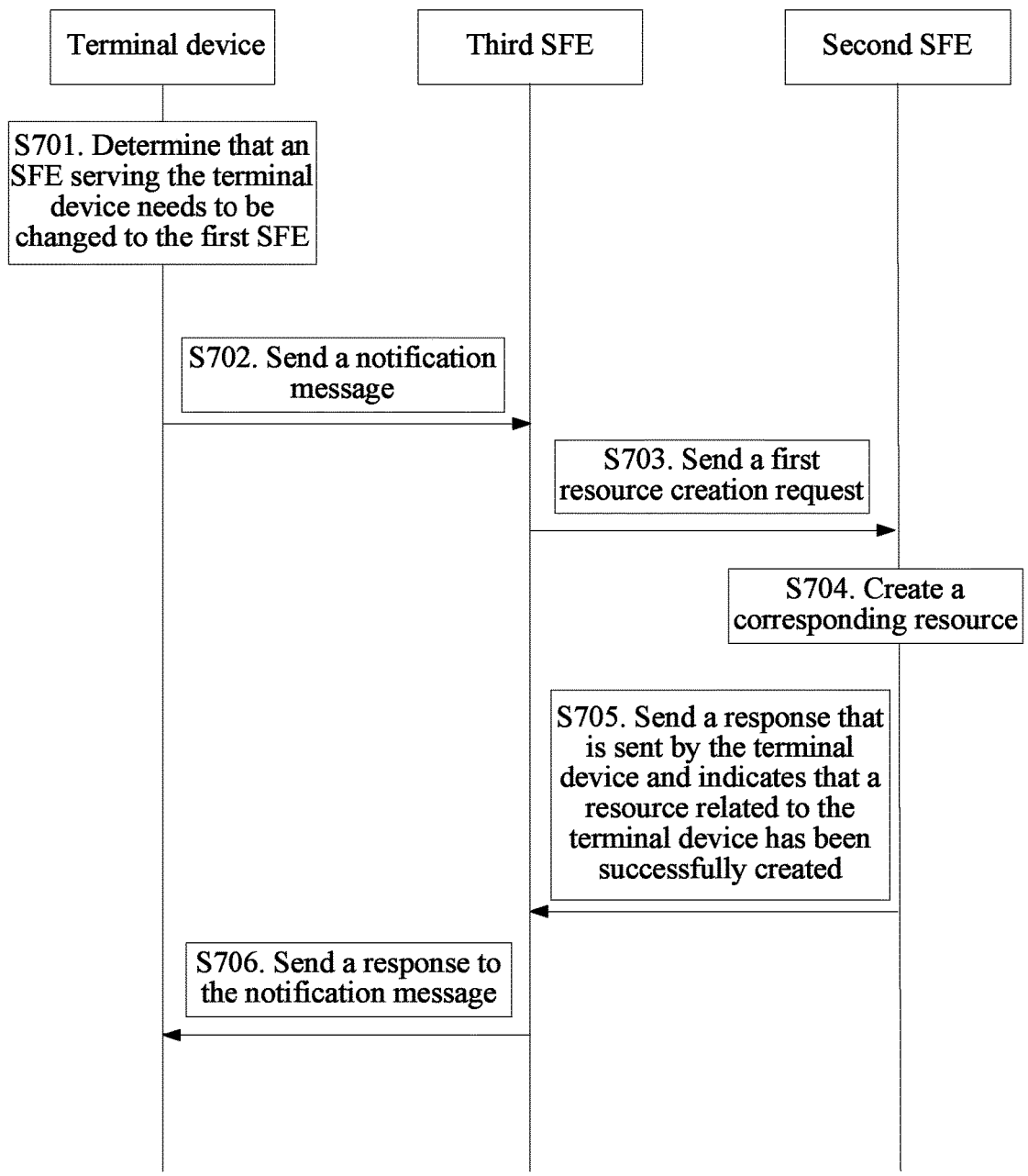
FIG. 7 is a schematic diagram of another resource migration method according to an embodiment of the present invention.

As shown in FIG. 7, specific steps are as follows:

S701. A terminal device determines that an SFE serving the terminal device needs to be changed to a first SFE.

S702. The terminal device sends a notification message to a third SFE.

Exemplarily, the notification message may be NOTIFY.

The notification message carries a first identifier, and the notification message is used to indicate that the third SFE needs to transfer a resource corresponding to the terminal device to a second SFE.

S703. The third SFE sends a first resource creation request to the second SFE.

The first resource creation request is used to request the second SFE to create a resource according to the first resource creation request, that is, the first resource creation request is used to request the second SFE to create a resource same as that of the third SFE; and the first resource creation request message carries content of the resource.

If the terminal device is a D device, the resource that needs to be created is an SFE resource, and exemplarily, the first resource creation request may be an SFE Create Request Indication; and if the terminal device is a D' device, the resource that needs to be created is an application application resource, and exemplarily, the first resource creation request may be an application Create Request Indication.

Before the third SFE sends the first resource creation request to the second SFE, if a resource/subresource corresponding to the terminal device has not been declared in the second SFE, the third SFE first declares the resource/subresource corresponding to the terminal device to the second SFE.

S704. The second SFE creates a corresponding resource.

If the resource/subresource corresponding to the terminal device has been declared in the second SFE, the second SFE creates a corresponding resource according to the first resource creation request from the third SFE.

S705. The second SFE sends, to the third SFE, a response that is sent by the terminal device and indicates that a resource related to the terminal device has been successfully created.

S706. The third SFE sends a response to the notification message to the terminal device.

The response message is used to indicate transfer completion of the terminal resource.

Subsequent steps in this embodiment may be the same as related steps in the foregoing embodiment according to different cases (preconditions), which are not described herein.

By using the resource migration method provided in the foregoing embodiment, the terminal device can change, according to a specific condition, the SFE serving the terminal device.

Figure 8:
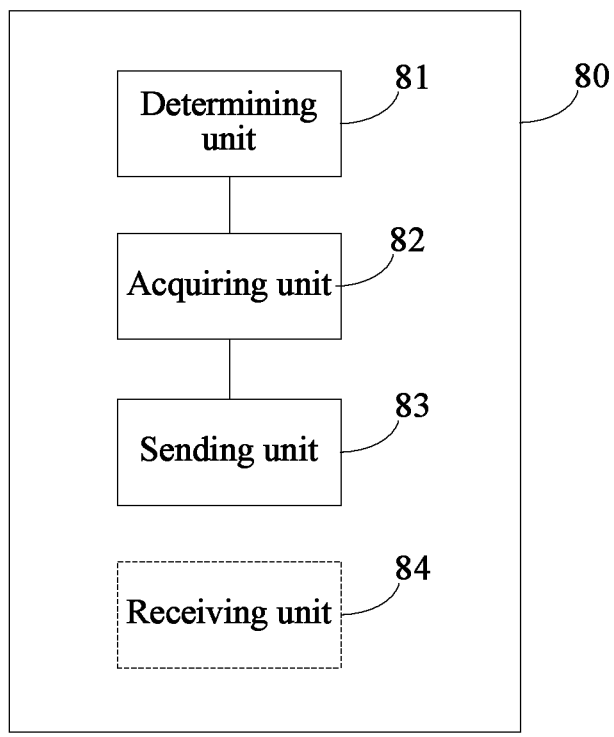
FIG. 8 is a schematic diagram of a resource migration apparatus according to an embodiment of the present invention.

An embodiment of the present invention further provides a resource migration apparatus 80. As shown in FIG. 8, the apparatus 80 includes:

a determining unit 81, configured to determine, by a terminal device, that a service function entity SFE serving the terminal device needs to be changed to a first SFE;

an acquiring unit 82, configured to acquire information about a location of a resource/subresource corresponding to the terminal device in a second SFE, where the second SFE saves the resource/subresource corresponding to the terminal device; and a sending unit 83, configured to send, to the first SFE, a first identifier and the information about the location of the resource/subresource corresponding to the terminal device in the second SFE, where the first identifier is used to indicate that the terminal device needs to change the SFE serving the terminal device, so that the first SFE transfers, after receiving the first identifier, the resource/subresource corresponding to the terminal device from the second SFE to the first SFE.

Optionally, the apparatus further includes a receiving unit 84, where the sending unit 83 is further configured to: before the terminal device sends, to the first SFE, the first identifier and the information about the location of the resource/subresource corresponding to the terminal device in the second SFE, send a first resource creation request to the first SFE, so that the first SFE creates a resource according to the first resource creation request, where the first resource creation request is used to register the terminal device with the first SFE, and the first resource creation request does not carry the first identifier and the information about the location of the resource/subresource corresponding to the terminal device in the second SFE; and the receiving unit 84 is configured to receive, by the terminal device, a response to the first resource creation request, where the response is sent by the first SFE.

Optionally, the sending unit 83 is specifically configured to:

in a case in which the response to the first resource creation request indicates that resource creation succeeds, send, to the first SFE, the first identifier and the information about the location of the resource/subresource corresponding to the terminal device in the second SFE.

Optionally, the sending unit 83 is specifically configured to:

send, by the terminal device, a first resource creation request to the first SFE, where the first resource creation request carries the first identifier and the information about the location of the resource/subresource corresponding to the terminal device in the second SFE.

Optionally, the sending unit 83 is further configured to: if the first SFE does not have rights to retrieve the resource/subresource from the second SFE, send an access rights update request to the second SFE, where the access rights update request is used to request the second SFE to grant the first SFE the rights to retrieve the resource/subresource from the second SFE; and the receiving unit 84 is further configured to receive, from the second SFE, a response to the retrieve rights update request.

Optionally, the sending unit 83 is further configured to send an access rights retrieve request to the second SFE, where the access rights retrieve request is used to determine whether the first SFE has the rights to retrieve the resource/subresource from the second SFE; and the receiving unit 84 is further configured to receive, from the second SFE, a response to the access rights retrieve request.

Optionally, the sending unit 83 is specifically configured to:

in a case in which the response to the access rights retrieve request indicates that the first SFE does not have the rights to access the resource/subresource in the second SFE, send the access rights update request to the second SFE.

Optionally, the receiving unit 84 is further configured to:

receive resource transfer success indication information sent by the first SFE, where the resource transfer success indication information is used to indicate that the resource/subresource corresponding to the terminal device has been transferred from the second SFE to the first SFE.

Optionally, the resource transfer success indication information is a response indicating a success of a second resource creation request or a response indicating a success of a resource update request, where the second resource creation request is used to request the first SFE to create a subresource.

Optionally, the sending unit 83 is further configured to:

send a resource deletion request or a resource update request to a third SFE, where the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

Optionally, the second SFE is a serving SFE that serves the terminal device before the terminal device changes the SFE serving the terminal device or a transit SFE with which the first SFE and the second SFE are both registered.

Optionally, the sending unit 83 is further configured to: in a case in which the second SFE and a third SFE are different SFEs, and the third SFE is a serving SFE that serves the terminal device before the terminal device changes the SFE serving the terminal device, and after the terminal device determines that the SFE serving the terminal device needs to be changed to the first SFE, send the first identifier to the third SFE, so that the third SFE sends the resource/subresource corresponding to the terminal device to the second SFE; and the receiving unit 84 is further configured to receive the information about the location of the resource corresponding to the terminal device in the second SFE, where the information about the location is sent by the second SFE.

Optionally, the information about the location includes a save path or a uniform resource identifier URI of the resource/subresource corresponding to the terminal device in the second SFE.

By using the resource migration apparatus provided in the foregoing embodiment, the terminal device can change, according to a specific condition, the SFE serving the terminal device.

Figure 9:
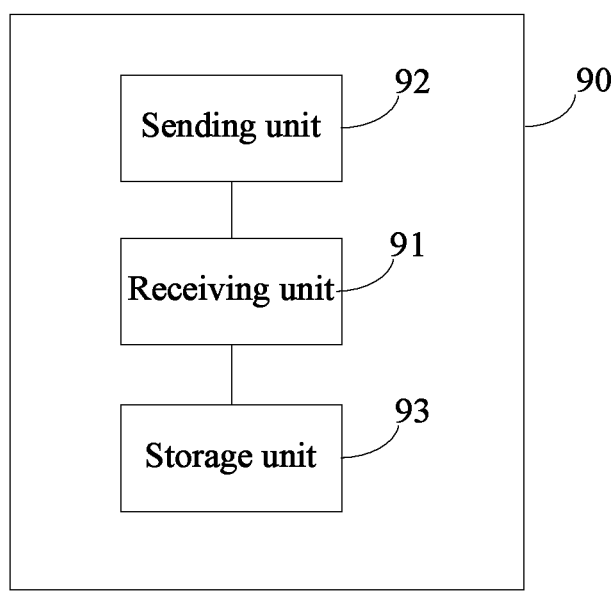
FIG. 9 is a schematic diagram of another resource migration apparatus according to an embodiment of the present invention.

An embodiment of the present invention further provides a resource migration apparatus 90. As shown in FIG. 9, the apparatus 90 includes:

a receiving unit 91, a sending unit 92, and a storage unit 93, where the receiving unit 91 is configured to receive, by a first SFE, a first identifier and information about a location of a resource/subresource corresponding to a terminal device in a second SFE, where the first identifier is used to indicate that the terminal device needs to change an SFE serving the terminal device;

the sending unit 92 is configured to send a resource retrieve request to the second SFE, where the resource retrieve request includes the information about the location of the resource/subresource corresponding to the terminal device in the second SFE;

the receiving unit 91 is further configured to receive content, which is returned by the second SFE, of the resource/subresource; and the storage unit 93 is configured to store the content, which is returned by the second SFE, of the resource/subresource.

Optionally, the receiving unit 91 is specifically configured to:

receive, by the first SFE, the first identifier and the information about the location of the resource/subresource corresponding to the terminal device in the second SFE; or receive, by the first SFE, the first identifier and the information about the location of the resource/subresource corresponding to the terminal device in the second SFE that are sent by a serving SFE that serves the terminal device before the terminal device changes the SFE serving the terminal device.

Figure 10:
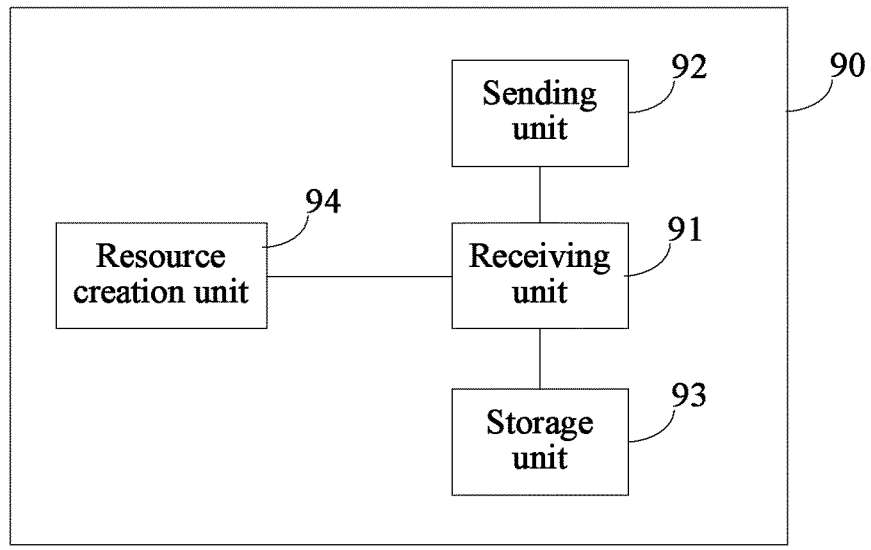
FIG. 10 is a schematic diagram of another resource migration apparatus according to an embodiment of the present invention.

Optionally, as shown in FIG. 10, the apparatus 90 further includes a resource creation unit 94, where the receiving unit 91 is further configured to receive a first resource creation request before the first SFE receives the first identifier and the information about the location of the resource/subresource corresponding to the terminal device in the second SFE;

the resource creation unit 94 is configured to create a corresponding resource according to the first resource creation request; and the sending unit 92 is further configured to send a response to the first resource creation request to the terminal device.

Optionally, the receiving unit 91 is specifically configured to:

in a case in which the response to the first resource creation request indicates that resource creation succeeds, receive a resource transfer request, where the resource transfer request carries the first identifier and the information about the location of the resource/subresource corresponding to the terminal device in the second SFE.

Optionally, the resource transfer request is a second resource creation request or a resource update request, where the second resource creation request is used to request the first SFE to create a subresource.

Alternatively, optionally, the apparatus 90 further includes a resource creation unit 94, where the receiving unit is specifically configured to receive a first resource creation request, where the first resource creation request carries the first identifier and the information about the location of the resource/subresource corresponding to the terminal device in the second SFE; and the resource creation unit 94 is configured to create a corresponding resource according to the first resource creation request.

Figure 11:
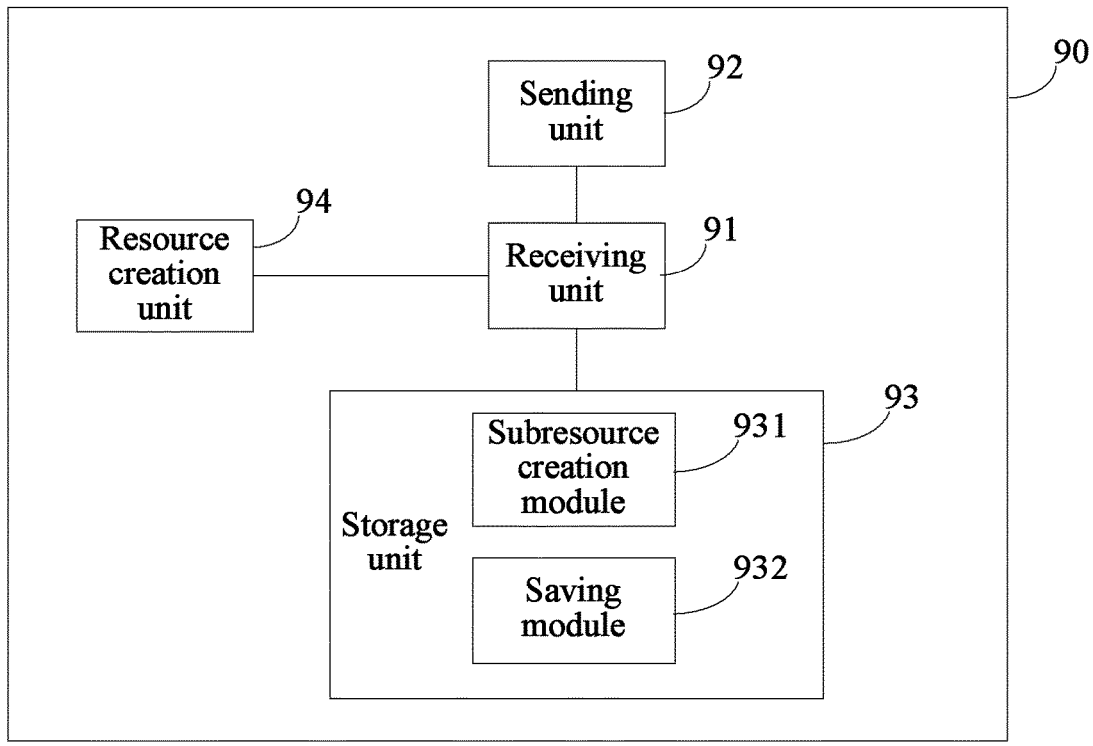
FIG. 11 is a schematic diagram of another resource migration apparatus according to an embodiment of the present invention.

Optionally, as shown in FIG. 11, the storage unit 93 includes: a subresource creation module 931 and a saving module 932, where the subresource creation module 931 is configured to: in a case in which the first SFE receives the information about the location of the subresource of the terminal device in the second SFE, create a subresource according to the information about the location of the subresource of the terminal device in the second SFE;

the receiving unit 91 is further configured to receive the content, which is fed back by the second SFE according to the information about the location, of the subresource; and the saving module 932 is configured to save the received content, which is fed back by the second SFE according to the information about the location, of the subresource into the created subresource.

Alternatively, optionally, as shown in FIG. 11, the storage unit 93 includes: a subresource creation module 931 and a saving module 932, where the receiving unit 91 is further configured to receive the content, which is returned by the second SFE according to the information about the location, of the resource/subresource;

the subresource creation module 931 is configured to create a corresponding subresource according to the content of the resource/subresource; and the saving module 932 is configured to save the received content, which is fed back by the second SFE according to the information about the location, of the resource/subresource into the created resource/subresource.

Figure 12:
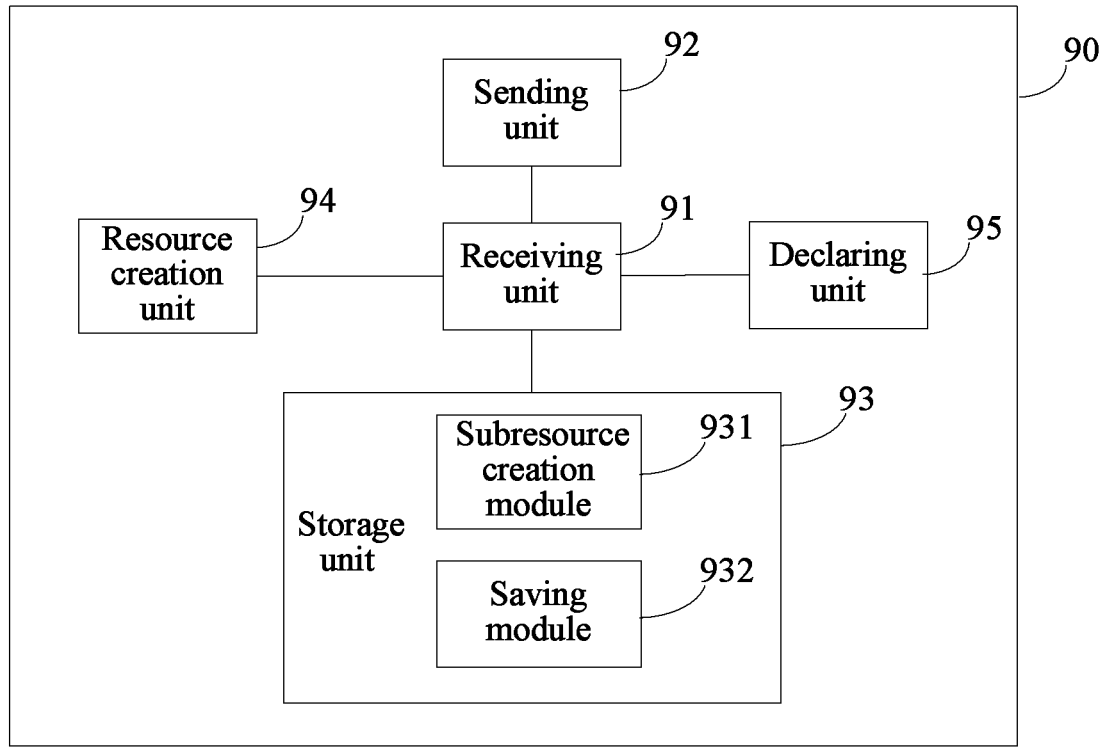
FIG. 12 is a schematic diagram of another resource migration apparatus according to an embodiment of the present invention.

Optionally, as shown in FIG. 12, the apparatus 90 may further include a declaring unit 95, where the declaring unit 95 is configured to declare the created resource to an SFE to which the created resource needs to be declared; and the declaring unit 95 is further configured to: after the content, which is fed back by the second SFE according to the information about the location, of the resource/subresource is received and stored, declare the received and stored resource to an SFE to which the received and stored resource needs to be declared.

Optionally, the sending unit 92 is further configured to:

send resource transfer success indication information to the terminal device, where the indication information is used to indicate that the resource/subresource corresponding to the terminal device has been transferred from the second SFE to the first SFE.

Optionally, the resource transfer success indication information is a response indicating a success of a second resource creation request or a response indicating a success of a resource update request, where the second resource creation request is used to request the first SFE to create a subresource.

Optionally, the sending unit 92 is specifically configured to:

send, by the first SFE, the resource retrieve request to a fourth SFE, so that the fourth SFE sends the resource retrieve request to the second SFE, where the fourth SFE is a transit SFE with which the first SFE and the second SFE are both registered, and the second SFE is a serving SFE that serves the terminal device before the terminal device changes the SFE serving the terminal device.

Optionally, the receiving unit 91 is further configured to:

receive the content, which is fed back by the second SFE according to the information about the location, of the resource/subresource, where the content is received by the fourth SFE from the second SFE.

Optionally, the information about the location includes a save path or a uniform resource identifier URI of the resource/subresource corresponding to the terminal device in the second SFE.

By using the resource migration apparatus provided in the foregoing embodiment, the terminal device can change, according to a specific condition, the SFE serving the terminal device.

Figure 13:
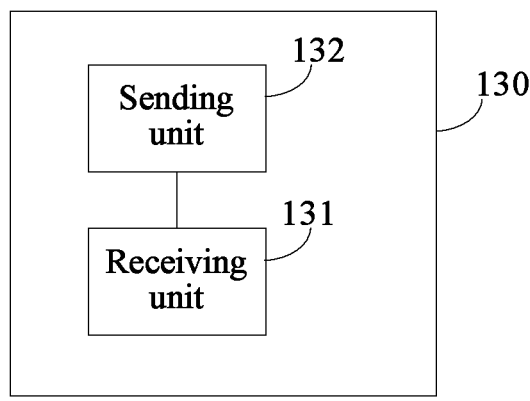
FIG. 13 is a schematic diagram of another resource migration apparatus according to an embodiment of the present invention.

An embodiment of the present invention further provides a resource migration apparatus 130. As shown in FIG. 13, the apparatus 130 includes:

a receiving unit 131, configured to receive a resource retrieve request sent by a first SFE, where the resource retrieve request includes information about a location of a resource/subresource corresponding to the terminal device in a second SFE; and a sending unit 132, configured to send a response to the resource retrieve request to the first SFE, where the response includes content, which is returned by the second SFE according to the information about the location, of the resource/subresource.

Optionally, the receiving unit 131 is further configured to: in a case in which the first SFE does not have rights to retrieve the resource/subresource from the second SFE, receive an access rights update request sent by the terminal device, where the access rights update request is used to request the second SFE to grant the first SFE the rights to retrieve the resource/subresource from the second SFE; and the sending unit 131 is further configured to send a response to the access rights update request to the terminal device.

Figure 14:
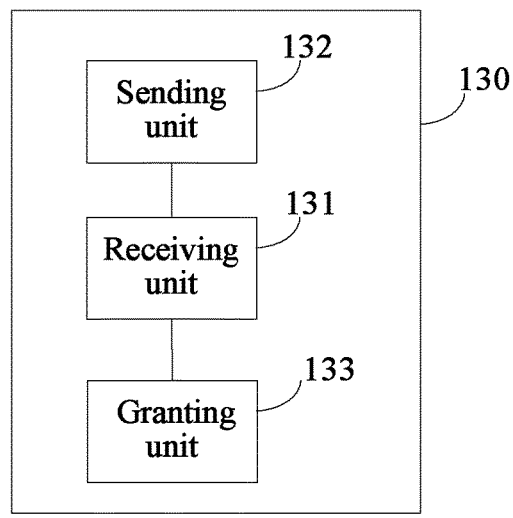
FIG. 14 is a schematic diagram of another resource migration apparatus according to an embodiment of the present invention.

As shown in FIG. 14, the apparatus 130 further includes a granting unit 133, where the receiving unit 131 is further configured to receive an access rights retrieve request sent by the terminal device, where the access rights retrieve request is used to determine whether the first SFE has the rights to retrieve the resource/subresource from the second SFE; and the granting unit 133 is configured to grant the first SFE the rights to retrieve the resource/subresource from the second SFE.

Optionally, the sending unit 132 is specifically configured to: if the first SFE has the rights to retrieve the resource/subresource from the second SFE, send the response to the resource retrieve request to the first SFE.

Optionally, the receiving unit 131 may be further configured to:

in a case in which the second SFE and a third SFE are a same SFE, and the second SFE is an SFE that serves the terminal device before the terminal device changes the SFE serving the terminal device, receive, by the second SFE, a resource deletion request sent by the terminal device, where the request is used to instruct the second SFE to delete the resource corresponding to the terminal device from the second SFE.

Optionally, the receiving unit 131 may be further configured to:

in a case in which the second SFE and a third SFE are a same SFE, and the second SFE is an SFE that serves the terminal device before the terminal device changes the SFE serving the terminal device, receive, by the second SFE, an expiration time update request sent by the terminal device, where the expiration time update request is used to update an expiration time of the resource.

Figure 15:
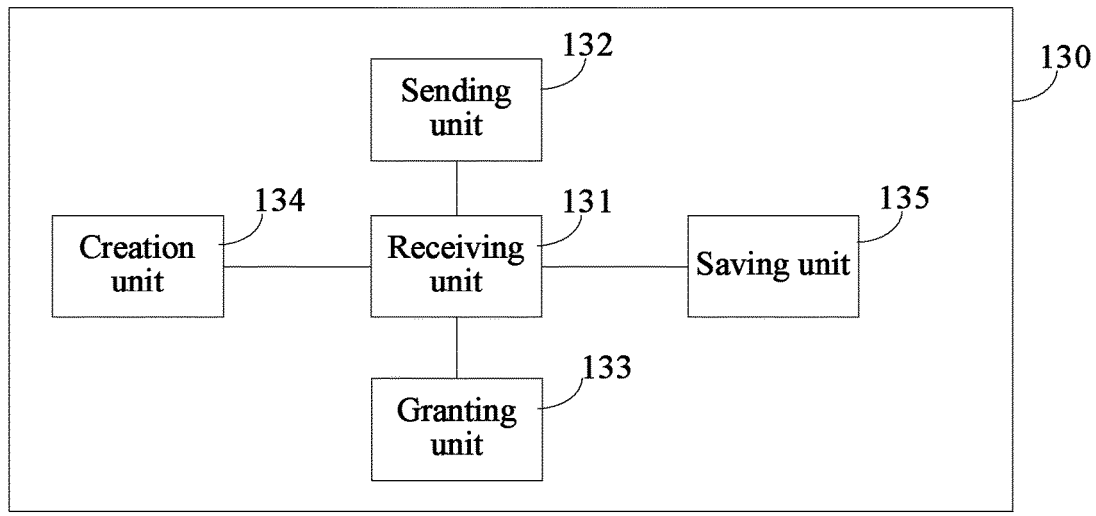
FIG. 15 is a schematic diagram of another resource migration apparatus according to an embodiment of the present invention.

As shown in FIG. 15, the apparatus 130 may further include: a creation unit 134 and a saving unit 135, where the receiving unit 131 is further configured to receive content, which is sent by a third SFE, of the resource/subresource corresponding to the terminal device;

the creation unit 134 is configured to create a corresponding resource/subresource according to the content, which is sent by the third SFE, of the resource/subresource corresponding to the terminal device;

the saving unit 135 is configured to save the content, which is sent by the third SFE, of the resource/subresource corresponding to the terminal device into the created resource/subresource; and the sending unit 132 is further configured to send information about a location of the resource/subresource created by the second SFE to the terminal device.

Figure 16:
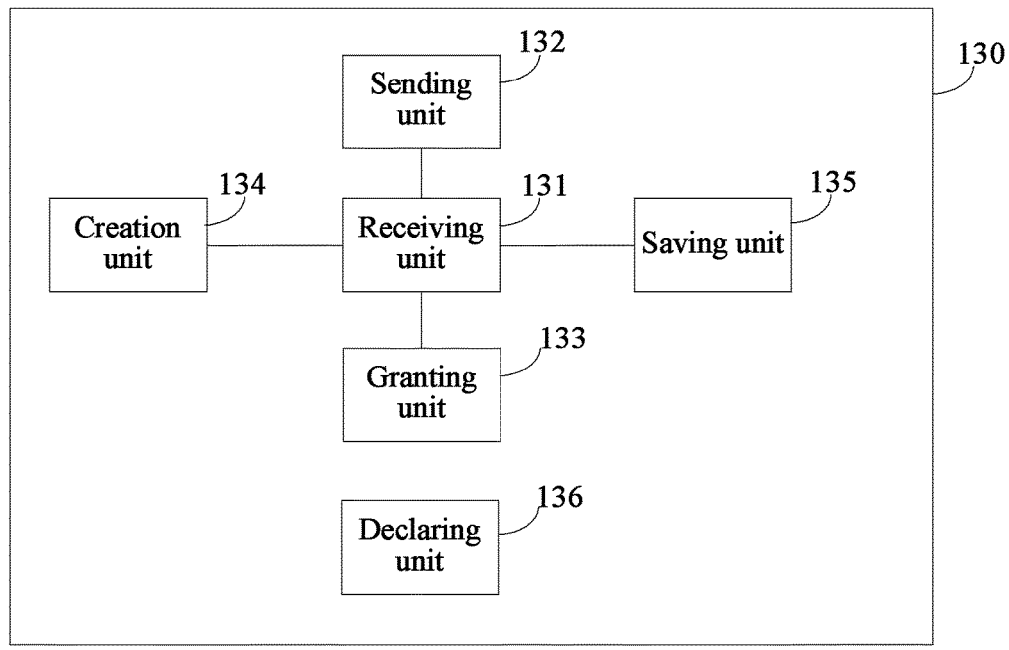
FIG. 16 is a schematic diagram of another resource migration apparatus according to an embodiment of the present invention.

As shown in FIG. 16, the apparatus may further include a declaring unit 136, configured to: in a case in which the resource/subresource corresponding to the terminal device has not been declared in the second SFE, declare, by the third SFE, the resource/subresource corresponding to the terminal device to the second SFE, so that the second SFE creates a declaration resource corresponding to the terminal device.

Optionally, the information about the location includes a save path or a uniform resource identifier URI of the resource/subresource corresponding to the terminal device in the second SFE.

Optionally, the sending unit 132 is further configured to:

in a case in which the second SFE is an SFE that serves the terminal device before the terminal device changes the SFE serving the terminal device, send, to the first SFE, the first identifier and the information about the location of the resource/subresource corresponding to the terminal device in the second SFE, where the first identifier is used to indicate that the terminal device needs to change the SFE serving the terminal device.

By using the resource migration apparatus provided in the foregoing embodiment, the terminal device can change, according to a specific condition, the SFE serving the terminal device.

An embodiment of the present invention further provides a resource migration apparatus 170, where function modules in the apparatus can execute the foregoing corresponding steps. Reference may be made to the foregoing method embodiments for descriptions of the function modules, and details are not described herein.

Figure 17:
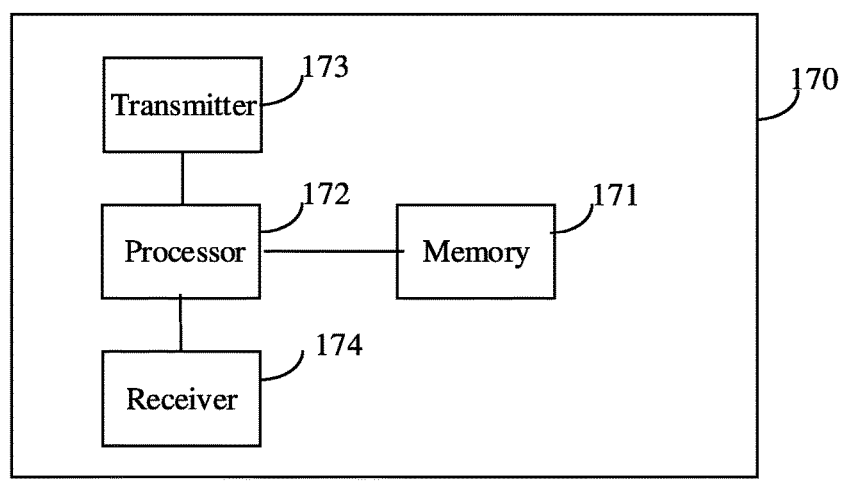
FIG. 17 is a schematic diagram of another resource migration apparatus according to an embodiment of the present invention.

As shown in FIG. 17, the apparatus 170 includes a memory 171, a processor 172, and a transmitter 173; and may further include a receiver 174.

The memory 171 is configured to store a set of program code, and the processor 172 is configured to invoke the program code stored in the memory 171 to execute a resource migration method provided in any embodiment of the present invention.

Specifically, the processor 172 is configured to determine, by a terminal device, that a service function entity SFE serving the terminal device needs to be changed to a first SFE.

The processor 172 is further configured to acquire information about a location of a resource/subresource corresponding to the terminal device in a second SFE, where the second SFE saves the resource/subresource corresponding to the terminal device.

The transmitter 173 is configured to send, to the first SFE, a first identifier and the information about the location of the resource/subresource corresponding to the terminal device in the second SFE, where the first identifier is used to indicate that the terminal device needs to change the SFE serving the terminal device, so that the first SFE transfers, after receiving the first identifier, the resource/subresource corresponding to the terminal device from the second SFE to the first SFE.

Specifically, before sending, to the first SFE, the first identifier and the information about the location of the resource/subresource corresponding to the terminal device in the second SFE, the transmitter 173 is further configured to:

send, by the terminal device, a first resource creation request to the first SFE, so that the first SFE creates a resource according to the first resource creation request, where the first resource creation request is used to register the terminal device with the first SFE, and the first resource creation request does not carry the first identifier and the information about the location of the resource/subresource corresponding to the terminal device in the second SFE.

The transmitter 173 is further configured to send an access rights update request to the second SFE, where the access rights update request is used to request the second SFE to grant the first SFE rights to retrieve the resource/subresource from the second SFE.

The transmitter 173 is further configured to send an access rights retrieve request to the second SFE, where the access rights retrieve request is used to determine whether the first SFE has the rights to retrieve the resource/subresource from the second SFE.

The transmitter 173 is further configured to: in a case in which a response to the access rights retrieve request indicates that the first SFE does not have the rights to access the resource/subresource in the second SFE, send the access rights update request to the second SFE.

The transmitter 173 is further configured to send a resource deletion request or a resource update request to a third SFE, where the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

The transmitter 173 is further configured to: in a case in which the second SFE and the third SFE are different SFEs, and the third SFE is a serving SFE that serves the terminal device before the terminal device changes the SFE serving the terminal device, and after the terminal device determines that the SFE serving the terminal device needs to be changed to the first SFE, send, by the terminal device, the first identifier to the third SFE, so that the third SFE sends the resource/subresource corresponding to the terminal device to the second SFE.

The receiver 174 is configured to receive, by the terminal device, a response to the first resource creation request, where the response is sent by the first SFE.

The receiver 174 is further configured to: in a case in which the response to the first resource creation request indicates that resource creation succeeds, send, to the first SFE, the first identifier and the information about the location of the resource/subresource corresponding to the terminal device in the second SFE.

The receiver 174 is further configured to receive, from the second SFE, a response to the access rights update request.

The receiver 174 is further configured to receive, from the second SFE, the response to the access rights retrieve request.

The receiver 174 is further configured to receive resource transfer success indication information sent by the first SFE, where the resource transfer success indication information is used to indicate that the resource/subresource corresponding to the terminal device has been transferred from the second SFE to the first SFE.

The receiver 174 is further configured to: in a case in which the second SFE and the third SFE are different SFEs, and the third SFE is a serving SFE that serves the terminal device before the terminal device changes the SFE serving the terminal device, and after the terminal device determines that the SFE serving the terminal device needs to be changed to the first SFE, receive the information about the location of the resource corresponding to the terminal device in the second SFE, where the information about the location is sent by the second SFE.

By using the resource migration apparatus provided in the foregoing embodiment, the terminal device can change, according to a specific condition, the SFE serving the terminal device.

An embodiment of the present invention further provides a resource migration apparatus 180, where function modules in the apparatus can execute the foregoing corresponding steps. Reference may be made to the foregoing method embodiments for descriptions of the function modules, and details are not described herein.

Figure 18:
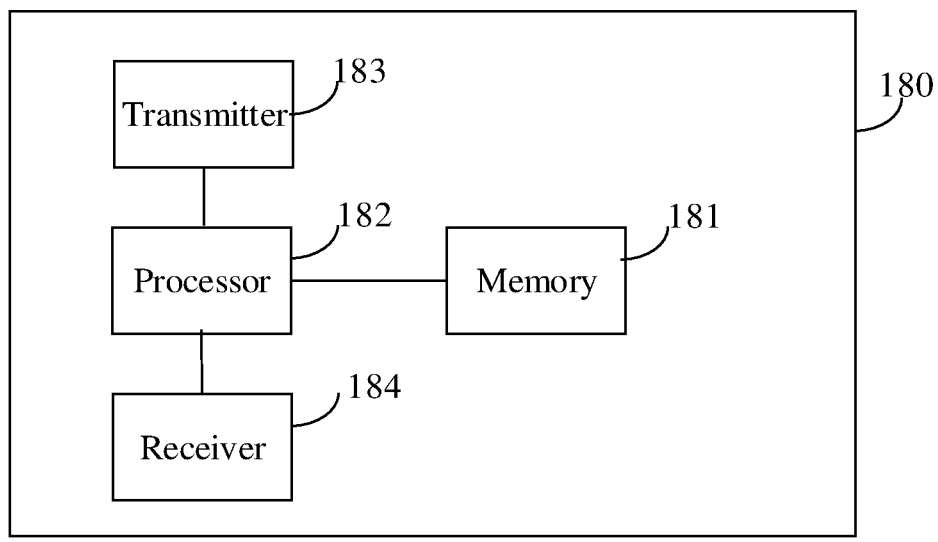
FIG. 18 is a schematic diagram of another resource migration apparatus according to an embodiment of the present invention.

As shown in FIG. 18, the apparatus 180 includes a memory 181, a processor 182, a transmitter 183, and a receiver 184.

The memory 181 is configured to store a set of program code, and the processor 182 is configured to invoke the program code stored in the memory 181 to execute a resource migration method provided in any embodiment of the present invention.

Specifically, the memory 181 is configured to save content, which is returned by the second SFE, of the resource/subresource.

The processor 182 is configured to create a corresponding resource according to the first resource creation request.

The processor 182 is further configured to: in a case in which the first SFE receives information about a location of a subresource of the terminal device in the second SFE, create a subresource according to the information about the location of the subresource of the terminal device in the second SFE.

The transmitter 183 is configured to send a resource retrieve request to the second SFE, where the resource retrieve request includes the information about the location of the resource/subresource corresponding to the terminal device in the second SFE.

The transmitter 183 is further configured to send a response to the first resource creation request before the first SFE receives a first identifier and the information about the location of the resource/subresource corresponding to the terminal device in the second SFE.

The transmitter 183 is further configured to declare, by the first SFE, the created resource to an SFE to which the created resource needs to be declared; and declare, by the first SFE, the received and stored resource to an SFE to which the received and stored resource needs to be declared.

The transmitter 183 is further configured to send resource transfer success indication information to the terminal device, where the indication information is used to indicate that the resource/subresource corresponding to the terminal device has been transferred from the second SFE to the first SFE.

The receiver 184 is configured to receive, by the first SFE, the first identifier and the information about the location of the resource/subresource corresponding to the terminal device in the second SFE, where the first identifier is used to indicate that the terminal device needs to change an SFE serving the terminal device.

The receiver 184 is further configured to receive the content, which is returned by the second SFE, of the resource/subresource.

The receiver 184 is further configured to receive, by the first SFE, the first identifier and the information about the location of the resource/subresource corresponding to the terminal device in the second SFE; or receive, by the first SFE, the first identifier and the information about the location of the resource/subresource corresponding to the terminal device in the second SFE that are sent by a serving SFE that serves the terminal device before the terminal device changes the SFE serving the terminal device.

The receiver 184 is further configured to receive the first resource creation request before the first SFE receives the first identifier and the information about the location of the resource/subresource corresponding to the terminal device in the second SFE, and create the corresponding resource according to the first resource creation request.

The receiver 184 is further configured to: in a case in which the response to the first resource creation request indicates that resource creation succeeds, receive a resource transfer request, where the resource transfer request carries the first identifier and the information about the location of the resource/subresource corresponding to the terminal device in the second SFE.

The receiver 184 is further configured to receive the first resource creation request, where the first resource creation request carries the first identifier and the information about the location of the resource/subresource corresponding to the terminal device in the second SFE.

The receiver 184 is further configured to: in a case in which the first SFE receives the information about the location of the subresource of the terminal device in the second SFE, receive the content, which is fed back by the second SFE according to the information about the location, of the subresource.

By using the resource migration apparatus provided in the foregoing embodiment, the terminal device can change, according to a specific condition, the SFE serving the terminal device.

An embodiment of the present invention further provides a resource migration apparatus 190, where function modules in the apparatus can execute the foregoing corresponding steps. Reference may be made to the foregoing method embodiments for descriptions of the function modules, and details are not described herein.

Figure 19:
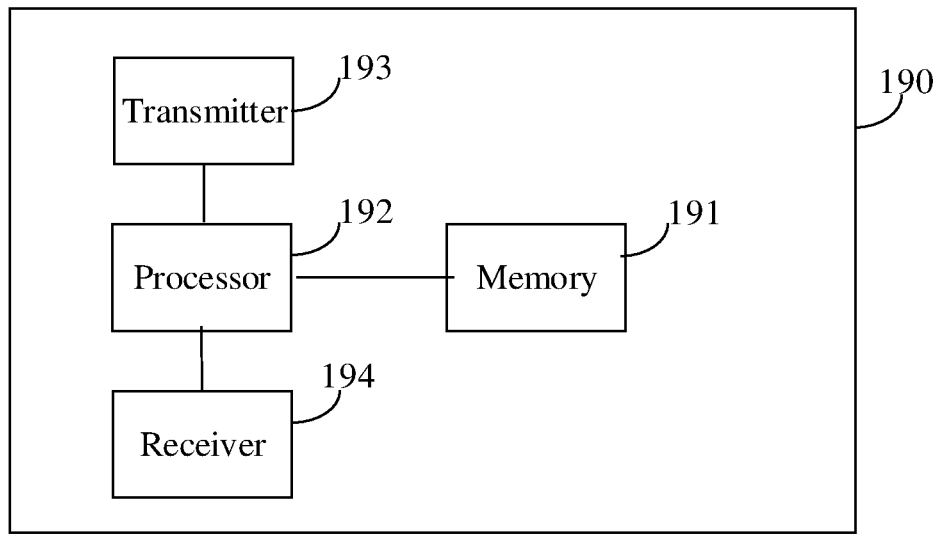
FIG. 19 is a schematic diagram of another resource migration apparatus according to an embodiment of the present invention.

As shown in FIG. 19, the apparatus 190 includes a memory 191, a processor 192, a transmitter 193, and a receiver 194.

The memory 191 is configured to store a set of program code, and the processor 192 is configured to invoke the program code stored in the memory 191 to execute a resource migration method provided in any embodiment of the present invention.

Specifically, the memory 191 is configured to save content, which is sent by the third SFE, of a resource/subresource corresponding to the terminal device into the created resource/subresource.

The processor 192 is configured to grant a first SFE rights to retrieve the resource/subresource from the second SFE.

The processor 192 is further configured to: in a case in which the second SFE and the third SFE are different SFEs, and the third SFE is an SFE that serves the terminal device before the terminal changes the SFE serving the terminal device, if the resource/subresource corresponding to the terminal device has been declared in the second SFE, and before a resource retrieve request sent by the first SFE is received, create a corresponding resource/subresource according to the content, which is sent by the third SFE, of the resource/subresource corresponding to the terminal device.

The transmitter 193 is configured to send a response to the resource retrieve request to the first SFE, where the response includes content, which is returned by the second SFE according to the information about the location, of the resource/subresource.

The transmitter 193 is further configured to: in a case in which the first SFE does not has the rights to retrieve the resource/subresource from the second SFE, send a response to the access rights update request to the terminal device.

The transmitter 193 is further configured to: in a case in which the first SFE has the rights to retrieve the resource/subresource from the second SFE, send the response to the resource retrieve request to the first SFE.

The transmitter 193 is further configured to: in a case in which the second SFE and the third SFE are different SFEs, and the third SFE is an SFE that serves the terminal device before the terminal changes the SFE serving the terminal device, if the resource/subresource corresponding to the terminal device has been declared in the second SFE, and before the resource retrieve request sent by the first SFE is received, send information about a location of the resource/subresource created by the second SFE, to the terminal device.

The transmitter 193 is further configured to: in a case in which the resource/subresource corresponding to the terminal device has not been declared in the second SFE, declare, by the third SFE, the resource/subresource corresponding to the terminal device to the second SFE, so that the second SFE, creates a declaration resource corresponding to the terminal device.

The transmitter 193 is further configured to: in a case in which the second SFE is an SFE that serves the terminal device before the terminal device changes the SFE serving the terminal device, send, to the first SFE, a first identifier and the information about the location of the resource/subresource corresponding to the terminal device in the second SFE, where the first identifier is used to indicate that the terminal device needs to change the SFE serving the terminal device.

The receiver 194 is configured to receive the resource retrieve request sent by the first SFE, where the resource retrieve request includes the information about the location of the resource/subresource corresponding to the terminal device in the second SFE.

The receiver 194 is further configured to: in a case in which the first SFE does not have the rights to retrieve the resource/subresource from the second SFE, receive the access rights update request sent by the terminal device, where the access rights update request is used to request the second SFE to grant the first SFE the rights to retrieve the resource/subresource from the second SFE.

The receiver 194 is further configured to receive an access rights retrieve request sent by the terminal device, where the access rights retrieve request is used to determine whether the first SFE has the rights to retrieve the resource/subresource from the second SFE.

The receiver 194 is further configured to: in a case in which the second SFE and the third SFE are a same SFE, and the second SFE is an SFE that serves the terminal device before the terminal device changes the SFE serving the terminal device, receive, by the second SFE, a resource deletion request sent by the terminal device, where the request is used to instruct the second SFE to delete the resource corresponding to the terminal device from the second SFE.

The receiver 194 is further configured to: in a case in which the second SFE and the third SFE are a same SFE, and the second SFE is an SFE that serves the terminal device before the terminal device changes the SFE serving the terminal device, receive, by the second SFE, an expiration time update request sent by the terminal device, where the expiration time update request is used to update an expiration time of the resource.

The receiver 194 is further configured to: in a case in which the second SFE and the third SFE are different SFEs, and the third SFE is an SFE that serves the terminal device before the terminal changes the SFE serving the terminal device, if the resource/subresource corresponding to the terminal device has been declared in the second SFE, and before the resource retrieve request sent by the first SFE is received, receive the content, which is sent by the third SFE, of the resource/subresource corresponding to the terminal device.

By using the resource migration apparatus provided in the foregoing embodiment, the terminal device can change, according to a specific condition, the SFE serving the terminal device.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, referred to as ROM), a random access memory (Random Access Memory, referred to as RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the spirit and scope of the technical solutions in the embodiments of the present invention.

The invention claimed is:

1. A resource migration method, wherein the method comprises:

determining, by a terminal device, that a service function entity, SFE, serving the terminal device needs to be changed to a first SFE;

acquiring, by the terminal device, information about a location of a resource/subresource corresponding to the terminal device in a second SFE, wherein the second SFE saves the resource/subresource corresponding to the terminal device;

sending, by the terminal device, a first resource creation request to the first SFE, where the first resource creation request is used to request the first SFE to create a resource according to the first resource creation request, the first resource creation request registers the terminal device with the first SFE, and the first resource creation request does not carry a first identifier and the information about the location of the resource/subresource corresponding to the terminal device in the second SFE; and sending, by the terminal device, to the first SFE, a first identifier and the acquired information, wherein the first identifier is used to indicate the terminal device needs to change the SFE serving the terminal device, so that, after receiving the first identifier, the first SFE transfers the resource/subresource from the second SFE to the first SFE.

2. The method according to claim 1, wherein before the sending, to the first SFE, a first identifier and the information about the location of the resource/subresource corresponding to the terminal device in the second SFE, the method further comprises:

sending, by the terminal device, a first resource creation request to the first SFE, wherein the first resource creation request is used to request the first SFE to create a resource according to the first resource creation request, the first resource creation request is used to register the terminal device with the first SFE, and the first resource creation request does not carry the first identifier and the information about the location of the resource/subresource corresponding to the terminal device in the second SFE; and receiving, by the terminal device, a response to the first resource creation request, wherein the response is sent by the first SFE.

3. The method according to claim 2, wherein the sending, to the first SFE, a first identifier and the information about the location of the resource/subresource corresponding to the terminal device in the second SFE comprises:

if the response to the first resource creation request indicates that resource creation succeeds, sending, by the terminal device to the first SFE, the first identifier and the information about the location of the resource/subresource corresponding to the terminal device in the second SFE.

4. The method according to claim 1, wherein the sending, to the first SFE, a first identifier and the information about the location of the resource/subresource corresponding to the terminal device in the second SFE comprises:

sending, by the terminal device, a first resource creation request to the first SFE, wherein the first resource creation request carries the first identifier and the information about the location of the resource/subresource corresponding to the terminal device in the second SFE.

5. The method according to claim 1, wherein the method further comprises:

receiving by the terminal device, resource transfer success indication information sent by the first SFE, wherein the resource transfer success indication information is used to indicate that the resource/subresource corresponding to the terminal device has been transferred from the second SFE to the first SFE.

6. The method according to claim 5, wherein the method further comprises:
sending, by the terminal device, a resource deletion request or a resource update request to a third SFE, wherein the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

7. The method according to claim 1, wherein the second SFE is a serving SFE that serves the terminal device before the terminal device changes the SFE serving the terminal device or a transit SFE with which the first SFE and the third SFE are both registered, and the third SFE is a serving SFE that serves the terminal device before the terminal device changes the SFE serving the terminal device.

8. The method according to claim 1, wherein the information about the location comprises a save path or a uniform resource identifier URI of the resource/subresource corresponding to the terminal device in the second SFE.

9. A resource migration method, wherein the method comprises:
receiving a first resource creation request, by a first SFE, where the first resource creation request is used to request the first SFE to create a resource according to the first resource creation request, the first resource creation request registers a terminal device with the first SFE, and the first resource creation request does not carry a first identifier and information about a location of a resource/subresource corresponding to the terminal device in a second SFE;
receiving, by the first SFE, the first identifier and information about the location of the resource/subresource corresponding to the terminal device in the second SFE, wherein the first identifier is used to indicate that the terminal device needs to change an SFE serving the terminal device;
sending a resource retrieve request to the second SFE, wherein the resource retrieve request comprises the information about the location of the resource/subresource corresponding to the terminal device in the second SFE; and
receiving and storing content, which is returned by the second SFE, of the resource/subresource.

10. The method according to claim 9, wherein the receiving, by a first SFE, a first identifier and information about a location of a resource/subresource corresponding to a terminal device in a second SFE comprises:
receiving, by the first SFE, the first identifier and the information about the location of the resource/subresource corresponding to the terminal device in the second SFE that are sent by the terminal device; or
receiving, by the first SFE, the first identifier and the information about the location of the resource/subresource corresponding to the terminal device in the second SFE that are sent by a serving SFE that serves the terminal device before the terminal device changes the SFE serving the terminal device.

11. The method according to claim 9, wherein the receiving, by a first SFE, a first identifier and information about a location of a resource/subresource corresponding to a terminal device in a second SFE comprises:
receiving a first resource creation request, wherein the first resource creation request carries the first identifier and the information about the location of the resource/subresource corresponding to the terminal device in the second SFE; and
creating a corresponding resource according to the first resource creation request.

12. The method according to claim 9, wherein if the first SFE receives the information about the location of the subresource corresponding to the terminal device in the second SFE, the receiving and storing content, which is fed back by the second SFE according to the information about the location, of the subresource comprises:
creating a subresource according to the information about the location of the subresource corresponding to the terminal device in the second SFE; and
receiving the content, which is returned by the second SFE according to the information about the location, of the subresource, and saving the received content into the created subresource.

13. The method according to claim 9, wherein the receiving and storing content, which is returned by the second SFE according to the information about the location, of the resource/subresource comprises:
receiving the content, which is returned by the second SFE according to the information about the location, of the resource/subresource;
creating a corresponding subresource according to the content of the resource/subresource; and
saving the received content, which is fed back by the second SFE according to the information about the location, of the resource/subresource into the created resource/subresource.

14. The method according to claim 9, wherein the method further comprises:
sending resource transfer success indication information to the terminal device, wherein the indication information is used to indicate that the resource/subresource corresponding to the terminal device has been transferred from the second SFE to the first SFE.

15. A resource migration apparatus, wherein the apparatus comprises:
a memory, a processor, a transmitter, and a receiver;
the memory is configured to store a set of program code, and the processor is configured to invoke the program code stored in the memory to:
determine that a service function entity SFE serving the terminal device needs to be changed to a first SFE; and
acquire information about a location of a resource/subresource corresponding to the terminal device in a second SFE, wherein the second SFE saves the resource/subresource corresponding to the terminal device; and
the transmitter is configured to
send a first resource creation request to the first SFE, where the first resource creation request is used to request the first SFE to create a resource according to the first resource creation request, the first resource creation request registers the terminal device with the first SFE, and the first resource creation request does not carry a first identifier and the information about the location of the resource/subresource corresponding to the terminal device in the second SFE; and send, to the first SFE, a first identifier and the acquired information, wherein the first identifier is used to indicate that the terminal device needs to change the SFE serving the terminal device, so that, after receiving the first identifier, the first SFE transfers the resource/subresource from the second SFE to the first SFE.

16. The apparatus according to claim 15, wherein the apparatus further comprises a receiving unit, wherein
the transmitter is further configured to send a first resource creation request to the first SFE, wherein the first resource creation request is used to request the first SFE to create a resource according to the first resource creation request, the first resource creation request is used to register the terminal device with the first SFE, and the first resource creation request does not carry the first identifier and the information about the location of the resource/subresource corresponding to the terminal device in the second SFE; and
the receiver is configured to receive, by the terminal device, a response to the first resource creation request, wherein the response is sent by the first SFE.

17. The apparatus according to claim 16, wherein the transmitter is configured to:
if the response to the first resource creation request indicates that resource creation succeeds, send, to the first SFE, the first identifier and the information about the location of the resource/subresource corresponding to the terminal device in the second SFE.

18. The apparatus according to claim 15, wherein the transmitter is configured to:
send a first resource creation request to the first SFE, wherein the first resource creation request carries the first identifier and the information about the location of the resource/subresource corresponding to the terminal device in the second SFE.

19. The apparatus according to claim 15, wherein the receiver is further configured to:
receive resource transfer success indication information sent by the first SFE, wherein the resource transfer success indication information is used to indicate that the resource/subresource corresponding to the terminal device has been transferred from the second SFE to the first SFE.

20. The apparatus according to claim 19, wherein the sending unit is further configured to:
send a resource deletion request or a resource update request to a third SFE, wherein the third SFE is a serving SFE that serves the terminal device before the terminal device changes the SFE serving the terminal device, the resource deletion request is used to request the third SFE to delete the resource/subresource corresponding to the terminal device, or the resource update request is used to instruct the third SFE to update an expiration time of the resource/subresource corresponding to the terminal device, so that the third SFE deletes the resource/subresource corresponding to the terminal device after the resource/subresource corresponding to the terminal device expires.

* * * * *